United States Patent
Marks et al.

(10) Patent No.: US 7,472,071 B2
(45) Date of Patent: Dec. 30, 2008

(54) INTERACTIVE SYSTEM FOR MANAGING QUESTIONS AND ANSWERS AMONG USERS AND EXPERTS

(75) Inventors: James D. Marks, New York, NY (US); Robert Weaver, Pottsville, PA (US); Jeremy Shao, Brooklyn Heights, NY (US)

(73) Assignee: Expertviewpoint LLC., New York, NY (US)

( * ) Notice: Subject to any disclaimer, the term of this patent is extended or adjusted under 35 U.S.C. 154(b) by 0 days.

(21) Appl. No.: 09/447,259

(22) Filed: Nov. 23, 1999

(65) Prior Publication Data

US 2003/0163356 A1 Aug. 28, 2003

(51) Int. Cl.
*G06F 9/44* (2006.01)
(52) U.S. Cl. .................................... 705/9; 705/4; 705/8
(58) Field of Classification Search ............ 705/1, 705/2, 3, 7, 8–9, 10, 4; 706/60, 924; 345/751, 345/758
See application file for complete search history.

(56) References Cited

U.S. PATENT DOCUMENTS

| | | | |
|---|---|---|---|
| 5,005,143 A * | 4/1991 | Altschuler et al. ........... 702/181 |
| 5,517,405 A | 5/1996 | McAndrew et al. ......... 364/401 |
| 5,689,641 A | 11/1997 | Ludwig et al. |
| 5,794,219 A | 8/1998 | Brown ......................... 705/37 |
| 5,819,267 A | 10/1998 | Uyama .......................... 707/6 |
| 5,862,223 A | 1/1999 | Walker et al. ................. 380/25 |
| 5,875,327 A | 2/1999 | Brant et al. |
| 5,880,731 A * | 3/1999 | Liles et al. ................... 715/758 |
| 5,890,149 A | 3/1999 | Schmonsees |
| 5,948,054 A * | 9/1999 | Nielsen ....................... 709/200 |
| 5,967,789 A | 10/1999 | Segel et al. ................... 434/236 |
| 6,026,148 A | 2/2000 | Dworkin et al. .......... 379/88.18 |
| 6,026,396 A | 2/2000 | Hall ............................. 707/4 |
| 6,039,688 A | 3/2000 | Douglas et al. |
| 6,058,395 A | 5/2000 | Buzagio et al. |
| 6,076,100 A | 6/2000 | Cottrille et al. ............. 709/203 |
| 6,085,176 A | 7/2000 | Woolston |
| 6,209,100 B1 | 3/2001 | Robertson et al. |
| 6,223,165 B1 * | 4/2001 | Lauffer .......................... 705/8 |

(Continued)

FOREIGN PATENT DOCUMENTS

DE  19812167 A1 * 12/1999

(Continued)

OTHER PUBLICATIONS

C. Hodgson, "Online expert databases and services," *Econtent*, v22, n6, p. 48-53, Dec. 1999.

(Continued)

*Primary Examiner*—Romain Jeanty
(74) *Attorney, Agent, or Firm*—Darby & Darby P.C.

(57) ABSTRACT

A method, executed by a server, for providing answers on one or more topics from a set of experts on each topic to questions posed by users. Users can direct questions to one or more specific experts, who in turn can answer the questions, refer the questions to other experts, or both. The server automatically organizes and stores questions and answers in various fora. An administrator can take advantage of the design of the system to create or change a forum without having to write or change low-level code.

32 Claims, 27 Drawing Sheets

U.S. PATENT DOCUMENTS

| | | | |
|---|---|---|---|
| 6,537,213 | B2 | 3/2003 | Dodds |
| 6,643,660 | B1 | 11/2003 | Miller et al. |
| 6,658,467 | B1 | 12/2003 | Rice et al. |
| 2003/0088461 | A1 | 5/2003 | Christensen |
| 2003/0177030 | A1 | 9/2003 | Turner et al. |
| 2004/0030781 | A1 | 2/2004 | Etesse et al. |

FOREIGN PATENT DOCUMENTS

| | | | |
|---|---|---|---|
| WO | WO 9804061 A1 * | 1/1998 | |
| WO | WO-0139076 A2 * | 9/2001 | |

OTHER PUBLICATIONS

M. Whitehead, "Advice Sites," *Internet Magazine*, Jun. 2000.
L. Teschler, "Advice On-line for Engineers," *Machine Design*, Jan. 14, 1999.
The web site "www.intelihealth.com".
"Do Sponsors Sway Health Web Sites?", *Wall Street Journal*, Feb. 8, 2000.
The web site "www.broaddaylight.com".
The web site "www.medformation.com".
The web site "www.exp.com".
The web site "www.experts.com".
The web site "www.inforocket.com".
The web site "www.askme.com".
The web site "www.expertcenteral.com".
The web site "www.frenzi.com".
The web site "www.knowpost.com".
The web site "www.keen.com".
The web site "www.ehow.com".
Hill, Scott. "There's Nothing Else Out There Like It: WebBoard Users TellWhy." WebBoard.com [online], Jan. 2000.
Figallo, Cliff. "Hosting Web Communities: Building Relationships, Increasing Customer." *Internet World*[online], 1998.
Coppeto, Thomas, et al., USENIX, "OLC: An On-Line Consulting System for UNIX", Summer 1989.
Screenshots from the website The Body.com. Obtained from www.archive.org. Screenshots archived on Mar. 4, 1998.

* cited by examiner

FIG. 3

THE BODY: AN AIDS AND HIV INFORMATION RESOURCE

 INSIGHT FROM EXPERTS    | HOME

This page is sponsored in part by

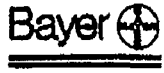      
              ORTHO BIOTECH

 ▲ BTG Pharmaceuticals ◆ MERCK

---

Learn more from America's leading experts and columnists working on AIDS/HIV.

---

 Your personal questions answered on a variety of topics in The Body's Interactive Q&A Forums:

Ask Rev. Steve Pieters your questions about HIV and spiritual support

TREATMENT
with
Cal Cohen, M.D., M.S.
Judith S. Currier, M.D., M.Sc.

ORAL HEALTH
with
David A. Reznik, DDS

WASTING, DIET
NUTRITION AND EXERCISE
with
Douglas Dieterich, M.D.
Alvan Fisher, M.D.
Marc Hellerstein, M.D., Ph.D.

MIXED-HIV-STATUS
COUPLES
with
Robert H. Remien, Ph.D.

SPIRITUAL SUPPORT
with
The Rev. A. Stephen Pieters
Father Rodney J. DeMartini

FATIGUE AND ANEMIA
with
J. B. Molaghan, NP, ACRN

OPPORTUNISTIC INFECTIONS
with
Judith S. Currier, M.D., M.Sc.

VIRAL LOAD AND
RESISTANCE
with
Mark Holodniy, M.D., FACP, CIC

MENTAL HEALTH
with
Michael Shernoff, MSW

SAFE SEX
AND TRANSMISSION
with
Rick Sowadsky, MSPH

WORKPLACE ISSUES
with
Nancy Breuer
Lynn L. Franzoi

FIG. 4

THE BODY: AN AIDS AND HIV INFORMATION RESOURCE

 TREATMENT FORUM   [HOME]

Disclaimer | To volunteer for clinical studies, click here.

Welcome to The Body's Treatment Forum. We are pleased to feature three outstanding HIV/AIDS specialists to answer your treatment questions: Cal Cohen, M.D., M.S., Judith S. Currier, M.D., M.Sc., and Andrew T. Pavia, M.D.

  

| Cal Cohen, M.D., M.S. | Judith S. Currier, M.D., M.Sc. | Andrew T. Pavia, M.D. |
| Harvard Medical School | University of California, Los Angeles School of Medicine | University of Utah School of Medicine |

From the beginning of the epidemic, these specialists have worked extensively with HIV/AIDS patients, either heading major American AIDS clinics or research facilities; they also see patients and teach other physicians. We invite you to draw on their exceptional expertise in HIV/AIDS treatment issues.

Read answered questions | Add your question to the list.

Worried if you are infected? Have a question on transmission/exposure/safe sex? Click here.

*Please Note:* Due to volume considerations, not all questions can be answered. Questions most likely to be answered will be those of general interest to a broad group of visitors to this forum. Questions pertaining to a specific case; requests for diagnosis, medical advice or second opinion; or requests for opinions about untested alternative therapies will generally not be answered.

Before posting a question, please read through recently answered questions below and answers archived by category at the end of this page. The doctors have already responded to a variety of questions and you may discover several that address your concerns.

For questions related to transmission or testing, please see The Body's Forum on Safe Sex and HIV Prevention. For questions on fatigue and/or anemia, please see The Body's Forum on Fatigue and Anemia. For questions on viral load and resistance testing, please see The Body's Forum on Viral Load and Resistance Testing. The participation of Drs. Cal Cohen and Judith Currier in this Treatment Forum is made possible by unrestricted educational grants from Bristol-Myers Squibb Immunology, Roxane Laboratories, Inc., and Merck & Co., Inc.

Answers to Recent Treatment Questions:

- HIV and malaria, yellow fever vaccine (November 19, 1999)
- TESTING FOR ILLEGAL DRUGS (November 19, 1999)

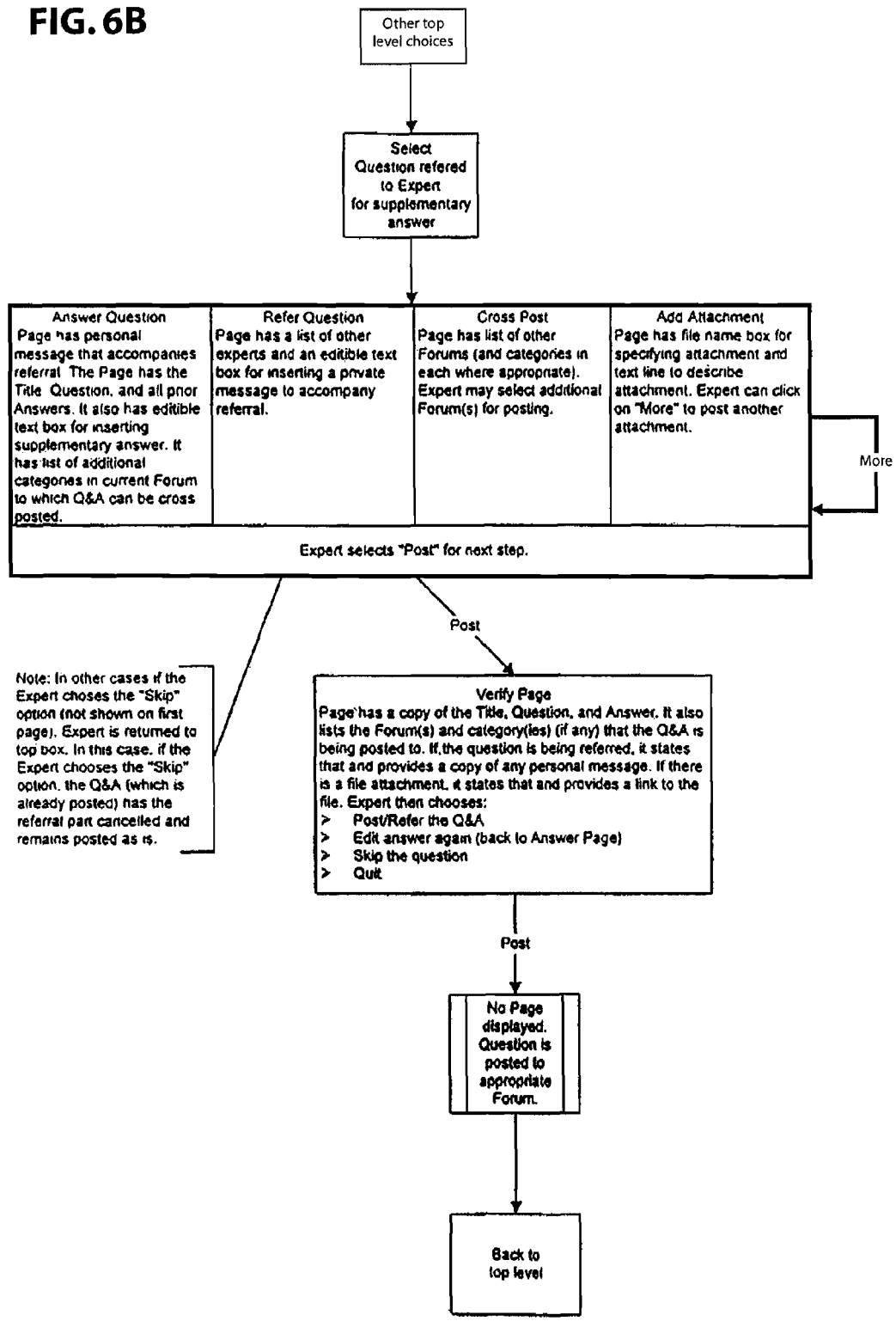

FIG. 7

THE BODY: AN AIDS AND HIV INFORMATION RESOURCE
Administrative Center

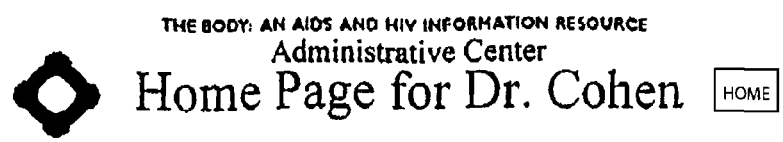

Home Page for Dr. Cohen  [HOME]

Hello, Dr. Cohen! There are currently 1118 question(s) awaiting answers from you. Please choose one of the following:

[REFER] Answer one or more of 10 questions referred to you by your colleagues.

[SUPPLEMENT] Provide a supplementary answer to one or more of 3 questions and answers referred to you by your colleagues.

[FOR ME] Answer one or more of 105 questions directed to you from the public through the Treatment Forum.

[GENERAL] Answer one or more of the 1000 questions directed to any doctor from the public through the Treatment Forum.

Or else select one of the following options:

[EDIT] Edit your answers to previous questions.

[QUIT] Quit the administrative center and return to the public portion of The Body.

Questions referred to you by your colleagues:

Questions sent to any doctor from the public at the Treatment Forum

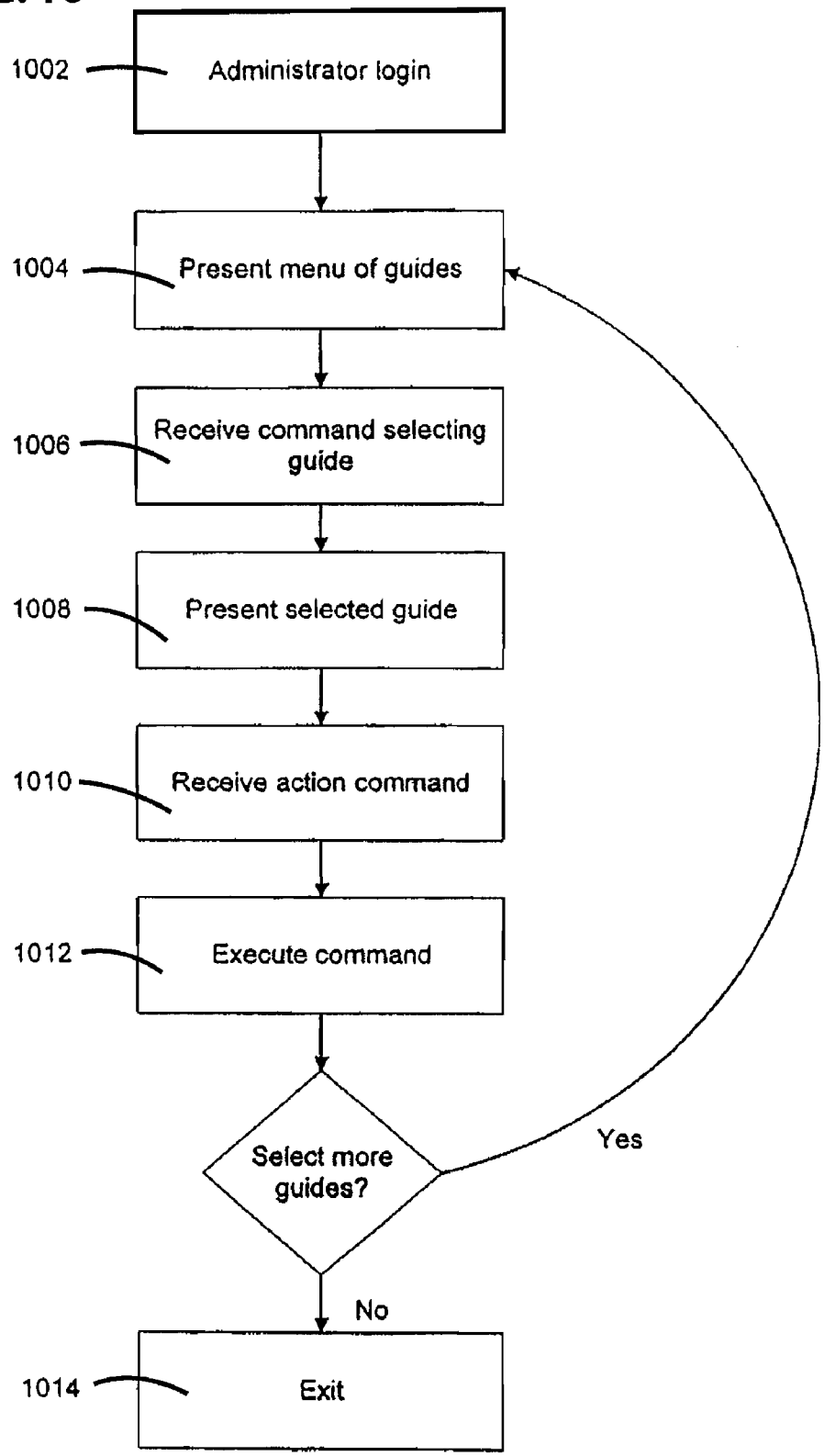

FIG. 12

THE BODY: AN AIDS AND HIV INFORMATION RESOURCE

Administrative Center
Welcome Joanne

[HOME]

General Operations

| CONFIGURE SYSTEM | Configure Whole System |
| ADD FORUM | Add A New Forum |
| KILL SESSION | Kill A Session |
| VIEW ADDITIONS | View Additions |

Personnel Operations

| ADD ADMINISTRATOR | Add an Administrator |
| ADD EXPERT | Add an Expert. |

Select An Expert For Edit ▼

| EDIT EXPERT | Edit / Delete This Expert. |

Select An Administrator For Deletion ▼

| DELETE ADMINISTRATOR | Delete This Administrator. |

Operations On a Specific Forum

Select A Forum To Work On ▼

| CONFIGURE FORUM | Configure (Edit) A Forum |
| CONFIGURE GROUP | Configure Group (Archive or Current) |
| ADD CATEGORY | Add A Category |
| CONFIGURE CATEGORY | Configure (Edit) Category |
| EDIT Q & A | Edit Question And Answer |

Change My Password

Old Password: _____

New Password: _____

New Password: _____
(again): _____

[CHANGE PASSWORD]

[QUIT]

FIG. 13

| | |
|---|---|
| Configure System | —1302 |
| Add Forum | —1304 |
| Configure Forum | —1306 |
| Configure Group (Current) | —1308 |
| Configure Group (Archived) | —1310 |
| Add Category | —1312 |
| Configure Category | —1313 |
| Add Expert | —1314 |
| Configure Expert | —1316 |
| Add Administrator | —1318 |
| Delete Administrator | —1320 |
| Edit Question | —1322 |
| Edit Answer | —1324 |
| Correct Forum Manually | —1326 |
| View New Material | —1328 |
| Change Password | —1330 |

US 7,472,071 B2

INTERACTIVE SYSTEM FOR MANAGING QUESTIONS AND ANSWERS AMONG USERS AND EXPERTS

BACKGROUND OF THE INVENTION

This invention relates generally to interactive systems. It relates more particularly to interactive systems on the World Wide Web which are designed to be easily modifiable.

In an interactive system, a user may engage in a dialog with a system through a series of interactions with the system, and the dialog results in changes to the system's behavior. Many World Wide Web sites are interactive. In contrast to static systems, where users simply read information posted on a site, interactive web sites allow users to alter a site's contents or behavior. Interactive web sites provide a unique opportunity for interaction between users and experts in a certain field. For example, in a question and answer exchange, a user can pose questions and receive answers from an expert, using an interactive web site to facilitate the exchange.

One problem with traditional interactive web sites is the difficulty in modifying them. These systems require system administrators and technical staff to control the interaction between users and administrators. Expensive staff members have to undertake tedious and repetitive tasks, such as archiving older messages and deleting unanswered questions. Systems and methods consistent with the current invention automate these administrative tasks, freeing up staff members to concentrate on aspects of the systems that require judgment and discretion.

A problem with existing interactive systems which use experts is the lack of flexibility available to experts when answering questions. When experts can give only one answer to a question, it is difficult to change an opinion or elaborate on an answer. Systems and methods consistent with the current invention give experts a great deal of flexibility and control. Experts can add references and pictures to their answer. They can refer questions to other experts for peer review or supplemental or alternative answers. They can post multiple answers to a single question. These capabilities help experts make their responses more accurate and complete.

SUMMARY OF THE INVENTION

In accordance with the present invention, a method executed by a server provides answers on one or more topics from a set of experts on each topic to questions posed by users in communication with client interfaces, the server being in communication with the client interfaces and the set of experts. In such a method, a question is received at the server from a user via one of the client interfaces and routed to one of the experts selected using information provided with the question. If no information is provided with the question, then the question is posted in a location where it is accessible to the experts and a command is received from the selected expert in response to the question. That command is then executed automatically.

Another method consistent with the present invention is executed by a server and modifies the management of separate fora related to corresponding topics. According to such a method, data is received identifying a user as an authorized administrator. Next, a menu of guides is presented to the identified administrator. The guides consist of a set of choices corresponding to different aspects of a forum. After that, a selection command is received from the administrator to select one of the guides. Then, the selected guide is presented to the administrator. Finally, an action command is received from the administrator indicating actions to be taken with respect to the selected guide, and the action command is executed.

An additional method consistent with the present invention is executed by a server and manages the server. The server has a hierarchical configuration composed of different levels arranged in order of increasing generalization, the levels consisting of names with corresponding values. After receiving a command to retrieve the value corresponding to a given name, the hierarchical structure of the system is searched for the given name. The value found associated with the given name at the least generic level of the system is presented.

DESCRIPTION OF THE DRAWINGS

The accompanying drawings, which are incorporated in and constitute a part of this specification, illustrate an implementation of the invention and, together with the description, explain the advantages and principles of the invention. In the drawings:

FIG. 3 is an example of a home page which offers a user a choice of several fora;

FIG. 4 is an example of a forum page for the treatment forum as it appears at a user interface;

FIGS. 6A-C depict a flow chart showing one implementation of an expert's interaction in detail;

FIG. 7 is an example of how an expert home page appears on an expert interface;

FIG. 10 is a flow chart showing the interaction between the system and an administrator;

FIG. 12 is an example of how an administrator's home page appears on an administrator's interface;

FIG. 13 represents the menu of guides which are stored on a server and presented by the system to an administrator;

DETAILED DESCRIPTION

Reference will now be made in detail to a presently preferred implementation of the invention. Whenever possible, the same reference numbers will be used in the description and the drawings to refer to the same or similar parts.

Systems and methods consistent with the present invention allow users to obtain information on a given subject by interacting with experts on that subject. Users can get answers to their questions either by asking a question or by reviewing answers to questions that others have posed. If asked a question, an expert can either provide an answer or refer the question to another expert.

In one embodiment, users can visit a web site to have their AIDS- and HIV-related questions answered by doctors and other experts in the field. The site provides several benefits to users. For instance, it lowers barriers between patients and clinicians, demystifies HIV/AIDS and its treatment, improves patients' quality of life, and fosters community through human connection.

The web site is divided into several fora based on subject matter within the broad topic of AIDS- and HIV-related information. Some fora have separate sections for recent questions and archived, or older, questions. Some fora further divide the archived questions into categories by subject matter. Each forum may have its own set of categories.

One possible implementation provides for dynamic management of each forum and of the system itself. If individual forum pages are properly designed, system administrators can make changes to the web site without using a low-level programming language, such as PERL, because system software automatically "manages" the questions and answers. The system itself stores questions and answers, handles categorization, makes the distinction between current and archived questions, allows creation and editing of pages, and manages the experts and their interrelationships.

Dynamic management of the system may be achieved using flexible "templates" instead of standard, fixed HTML documents to create the web pages. These templates may serve as a basis for only one page (e.g., the home page for the treatment forum) or for hundreds of pages (e.g., the layout for the question and answer pages). Templates differ from ordinary HTML pages in that they include commands that return information about parts of the system. These commands take the form of a standard interface to the low-level language (e.g., PERL) part of the system. By using these commands, administrators can change sections of the system easily, quickly, and without having to write or change low-level code.

A. System Overview

Figure 1:
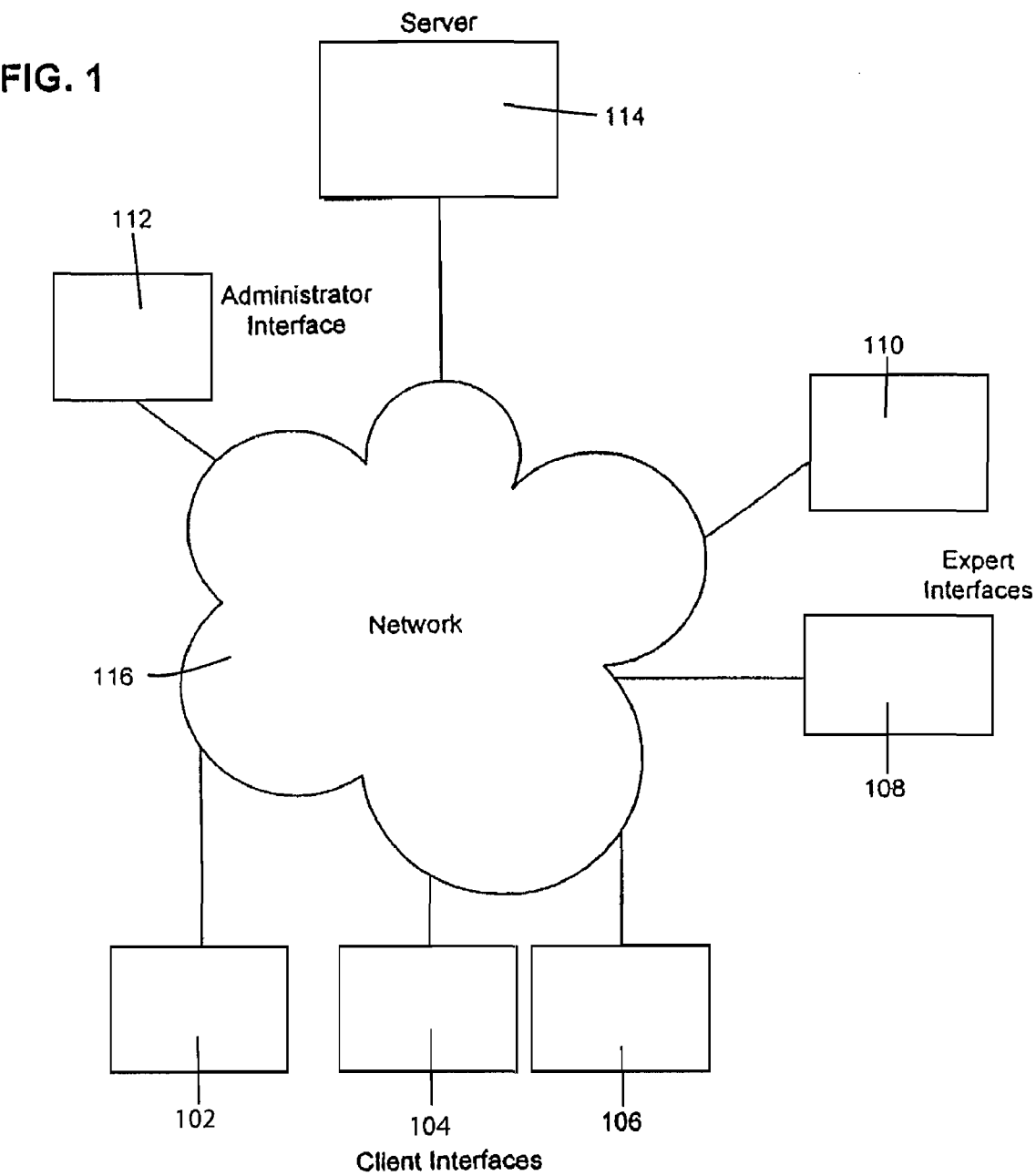
FIG. 1 depicts an information-sharing system consistent with the present invention.

FIG. 1 depicts an information-sharing system 100 consistent with the present invention. System 100 includes a number of devices such as computers 102, 104, and 106, with client interfaces, computers 108 and 110 with expert interfaces, a computer 112 with an administrator's interface, and server 114. Computers 102, 104, 106, 108, 110, and 112, and server 114 communicate via network 116. Network 116 could be, for example, the Internet, a private network, or any other suitable network. Although FIG. 1 shows a specific number of devices, one skilled in the art will recognize that any number of devices could be connected to network 116 without departing from the principles of the present invention.

Figure 2:
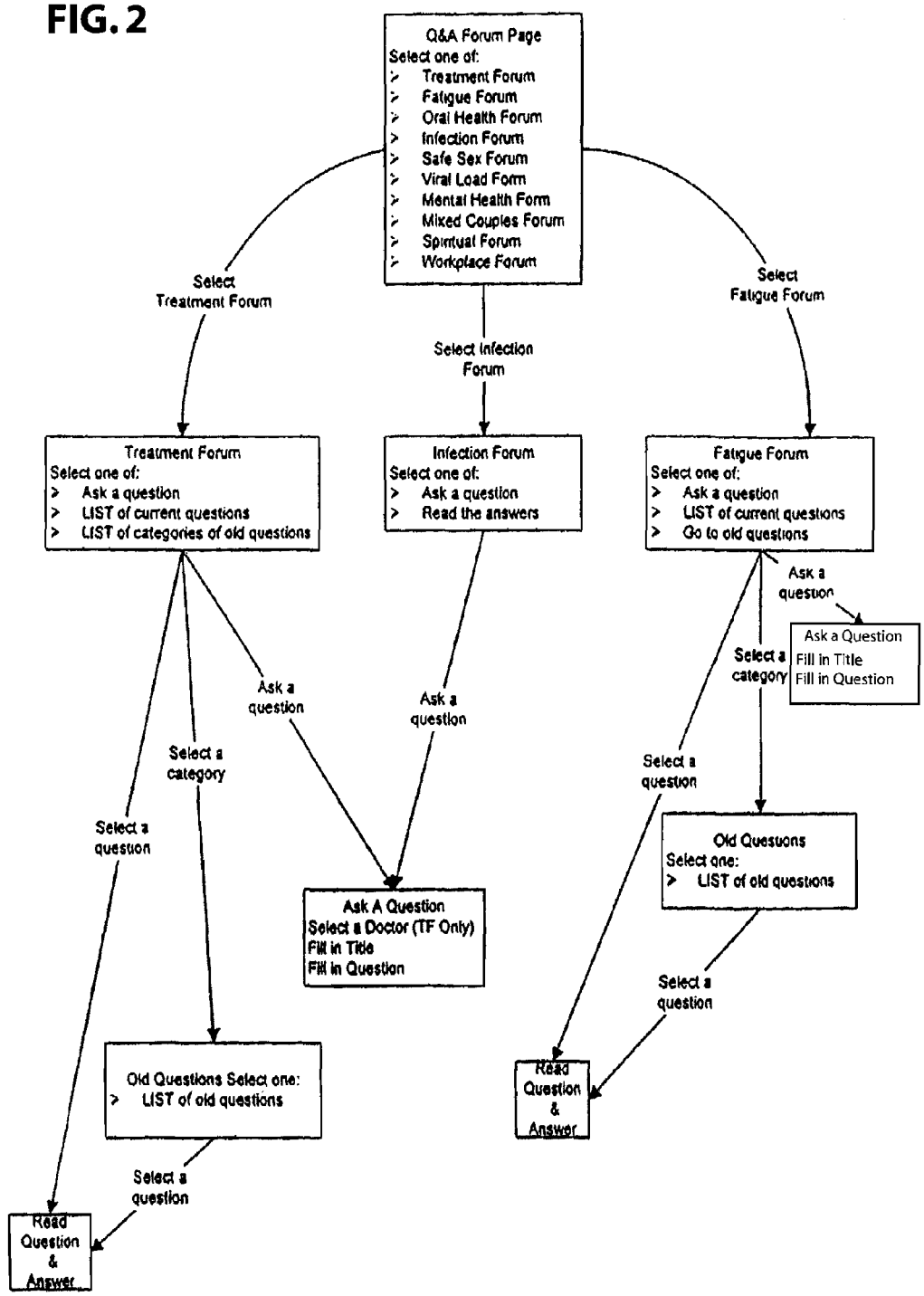
FIG. 2 is a flow chart of a user interface for a system consistent with the present invention.

FIG. 2 is a flow chart of one embodiment of a user interface for a system consistent with the present invention. Server 114 presents to the user a series of web pages. In response, the user makes selections via a client interface, e.g., computer 102, which are received by server 114. As shown in FIG. 2, the user is presented with a Q&A forum page, which offers a choice of fora, including: treatment, fatigue, oral health, infection, safe sex, viral load, mental health, mixed couples, spiritual, and workplace. Once the user selects a forum, a forum page gives the user several options, including ask a question, select a question, and select a category. If the user chooses to ask a question, a new page prompts the user to enter a title, a question, and, in some fora, an expert. If the user chooses to select a category, the user sees a list of questions and chooses which question to read. If the user chooses to select a question, the question and answer are presented to the user.

FIG. 3 is an example of what the Q&A forum page can look like. It can include a header, sponsorship information, photos of experts, and a set of options corresponding to the available fora.

FIG. 4 is an example of a forum page for the treatment forum as it appears at the user interface. The forum page lists the experts available in a specific forum. Experts can be available in one or more fora simultaneously. This allows users to address a panel of experts or have a more private interaction with a single expert. The forum page presents the user with options such as reading an answered question or adding a new question. These options can be unique to each forum. If the user chooses to read answered questions, server 114 can list the questions or prompt the user to specify a category of questions to list. If the user chooses to ask a question, server 114 displays a page which prompts the user to fill in a question and title. In one embodiment, fora permit a user to select an expert to receive the question.

B. Expert Interfaces

Figure 5:
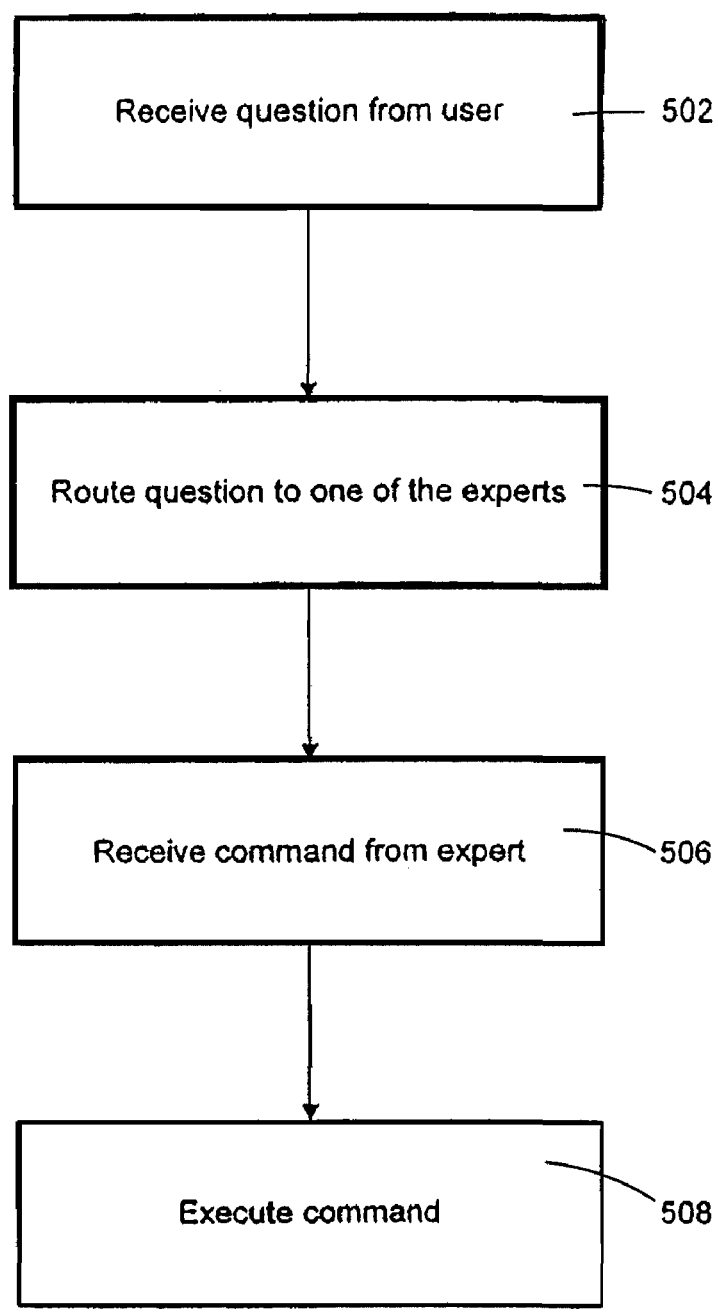
FIG. 5 is a flow chart depicting the steps involved with an expert's interaction with the system.

FIG. 5 is a flow chart depicting the steps involved with an expert's interaction with the system. The interaction begins when the system receives a question from the user (step 502). The question is input by the user at a client interface, such as computer 102, and transmitted via network 116 to server 114. Once the question is received by server 114, the system routes the question to one of the experts (step 504) at an expert interface, such as computer 110. The system then receives a command from the expert (step 506) via the expert interface. Finally, the system executes the command (step 508) at server 114.

Figure 6A:
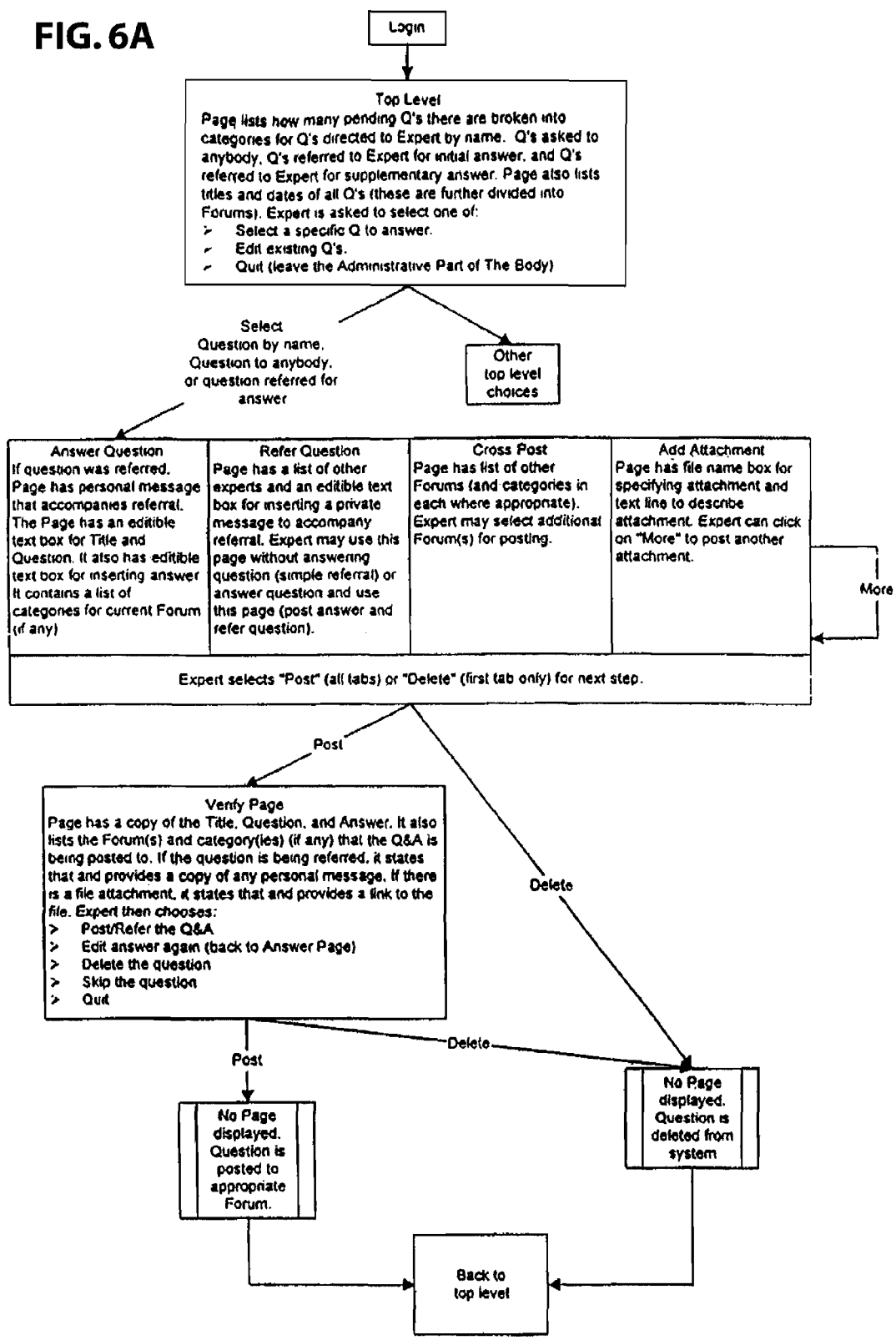
Figure 6C:
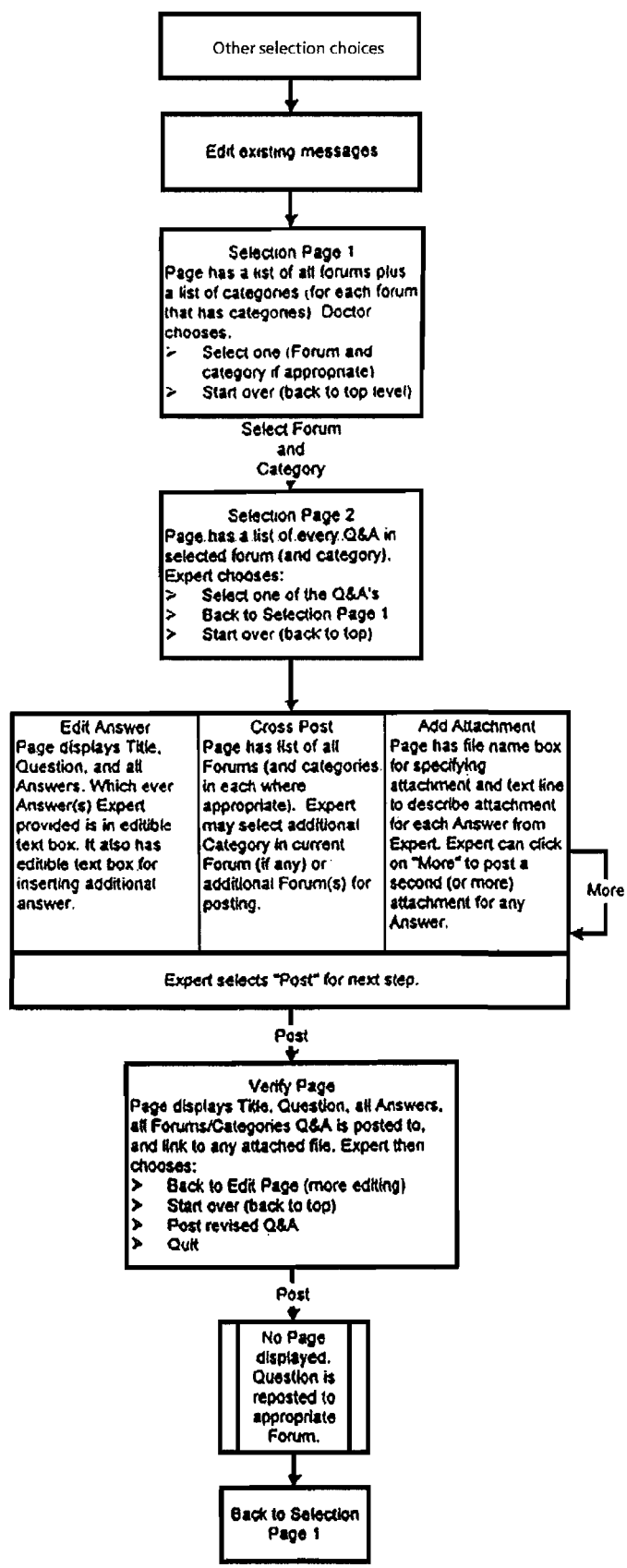

FIGS. 6A through 6C depict a flow chart showing one implementation of an expert's interaction in detail. The expert is presented with a home page, labeled "Top Level" in FIGS. 6A-C, from which a user can select a specific question to answer, edit existing questions, or quit. As shown in FIGS. 6A and 6B, once the expert selects a question to answer, the expert can then answer the question, refer the question, cross post the question in other fora, or add an attachment. Upon completing the chosen tasks, the expert chooses either post or delete, and is returned to the top level home page. The post command prompts the expert to verify the results and then the question is posted to the appropriate forum. The delete command deletes the question from the system.

FIG. 6C shows that, to edit existing messages, the expert first chooses a forum (and category, if appropriate) and then chooses a question and answer to edit. The expert can then edit the answer, cross post the answer to other fora, or add an attachment. When finished, the expert selects the post command, which prompts the expert to verify the results and then the question is re-posted to the appropriate forum. The expert may then choose another forum or return to the top level home page.

FIG. 7 is an example of how an expert home page can appear on an expert interface, such as computer 110. It can include the expert's name, a summary of the questions awaiting the expert's attention, an edit option, and a quit option. As shown in FIG. 7, questions can reach an expert in one of four ways: (1) unanswered questions referred by another expert; (2) previously-answered questions referred by another expert; (3) questions directed to a specific expert by a user; and (4) questions posted by a user with no expert selected. Regardless of the origin of questions, they all appear on the expert's home page. Collecting all of an expert's questions in this way saves the expert time and effort previously spent visiting several different locations looking for questions.

Figure 8:
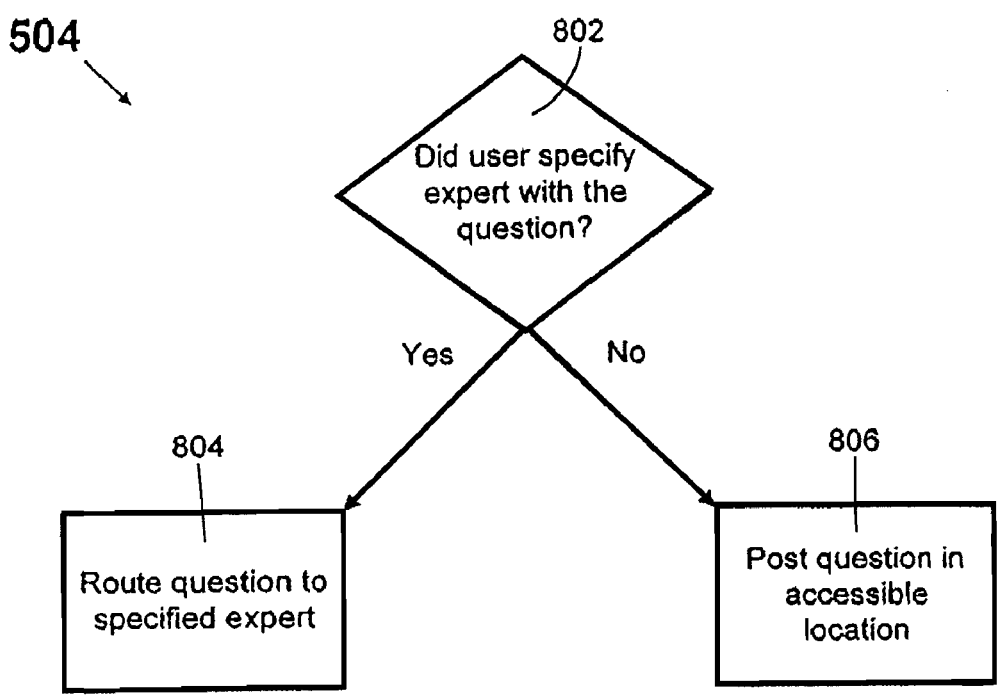
FIG. 8 represents the steps taken by the system to route a question to one of the experts.

FIG. 8 represents the steps taken by the system to route a question posed by a user to one of the experts (step 504). The system first determines whether the user specified an expert with the question (step 802). The user could have specified an expert while inputting the question at a client interface, such as computer 102. If the user specified an expert with the question, the system routes the question to that expert (step 804) at an expert interface, such as computer 110. If not, the system posts the question in a location on server 114 which is accessible to all experts in the forum (step 806).

Figure 9:
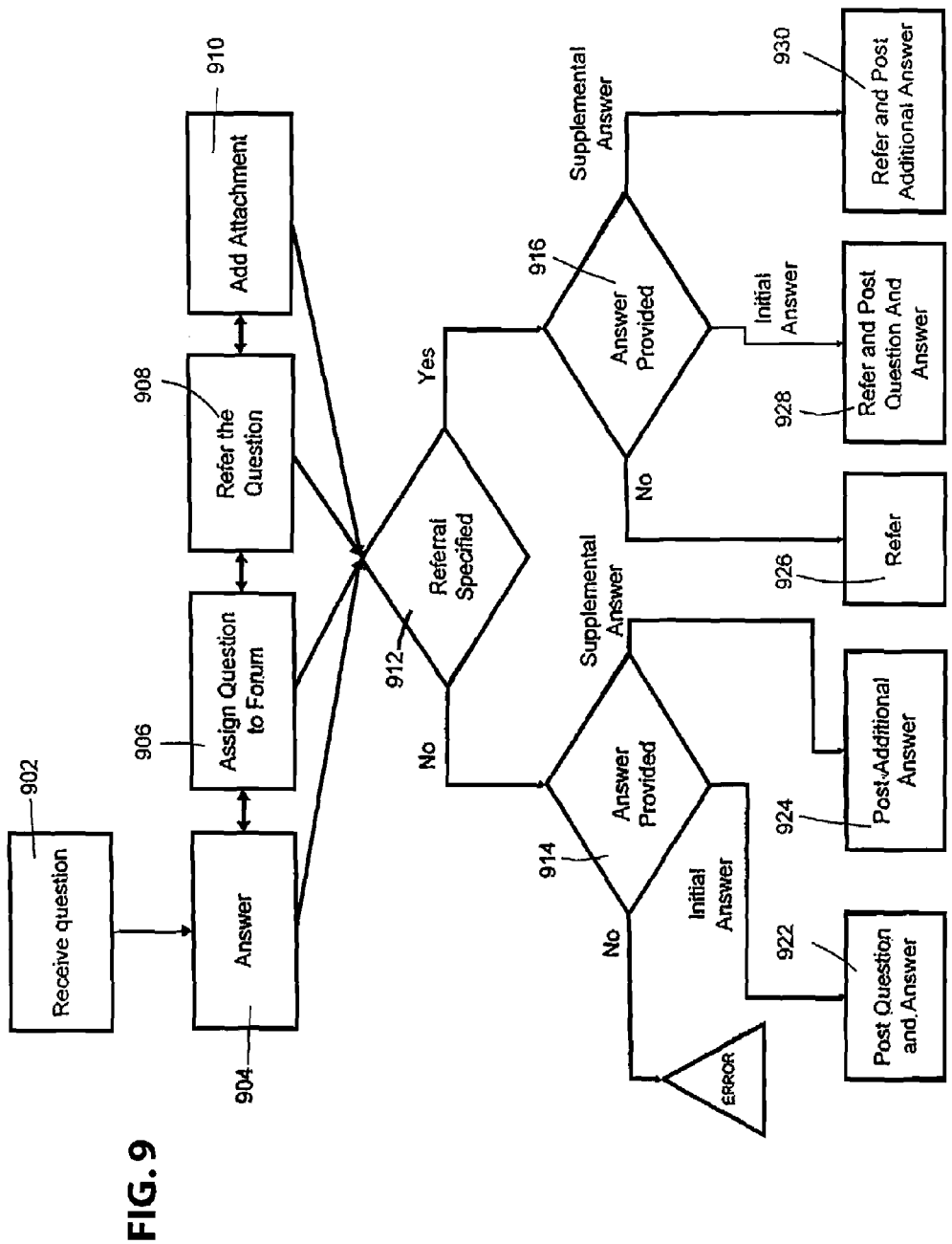
FIG. 9 is a flow chart illustrating options available to an expert upon receiving a question.

FIG. 9 is a flow chart illustrating options available to an expert upon receiving a question. First, the expert receives the question at an expert interface, such as computer 110 (step 902). The expert is presented with a four part answer set (steps 904, 906, 908, and 910) that allows him or her to make a variety of choices in answering the question. The expert can go from any part of the set to any other part at any time. In the first part, the expert can answer the question (step 904); in the second part, he or she can assign the question to a forum and/or category (step 906); in the third part, he or she can refer the question to another expert (step 908); and in the last part, he or she can add an attachment to an answer to the question (step 910). Once the expert has completed the chosen task or tasks, he or she exits by specifying that the results be posted. The system then examines whether there was a referral or not (step 912) and whether there was any answer and, if so, whether it is the first one or a supplemental one (steps 914 and 916). Depending on what combination the system finds, it determines that it should do one of the following: simply post the question and answer (step 922), post a supplemental answer to an existing question (step 924), refer the unanswered question (step 926), post the question and answer and refer it for a supplemental answer (step 928), or post the supplemental answer and also refer it for another supplemental answer (step 930).

A benefit of this embodiment is that real-time peer review is provided to experts. Experts in many fields rely on review by their peers to validate their opinions and research. Medical journals provide one avenue for peer review, but the publishing process of medical journals can take months. Second opinions provide another avenue for peer review, and patients frequently get a second opinion before accepting the treatment prescribed by their doctor. But, getting a second opinion can take weeks, during which the patient has to postpone treatment. Real-time peer review speeds up treatment.

Experts, including doctors, can post answers to questions and then refer them to other experts for a second (or third or fourth) opinion. Experts can also review answers given by other experts without being asked to do so. Users, including patients, can request that specific experts answer a question and then the users can read comments from other experts on those answers. Using the present invention, this entire review process can occur within hours, or even minutes.

C. Administrator Interface

FIG. 10 shows the interaction, consistent with the current invention, between a system and an administrator using administrator interface 112. First, an administrator logs into the system via administrator interface 112 (step 1002). The system then presents the administrator with a menu of guides stored on server 114 (step 1004). Each guide consists of a set of choices corresponding to different aspects of a forum within the system. After presenting a menu of guides to the administrator, the system receives a command from the administrator, via administrator interface 112, selecting a guide (step 1006). The system then presents the guide selected to the administrator at administrator interface 112 (step 1008). Next, the system receives an action command from the administrator, via administrator interface 112, in response to the guide (step 1010). The system then executes the command received (step 1012). The administrator can then choose, via administrator interface 112, to log out (step 1014), or be presented with the menu of guides again, returning to step 1004.

FIGS. 11A through 11J depict a flow chart showing one implementation of an administrator's interaction in detail. The administrator is presented with a home page, labeled "Top Level," which offers several options, including: configure the system, add or configure a forum, configure a group of either current or archived messages, add or configure a category, add or configure an expert, add or delete an administrator, edit a question or answer, correct a forum manually, view new material, or change the administrator's password.

Figure 11A:
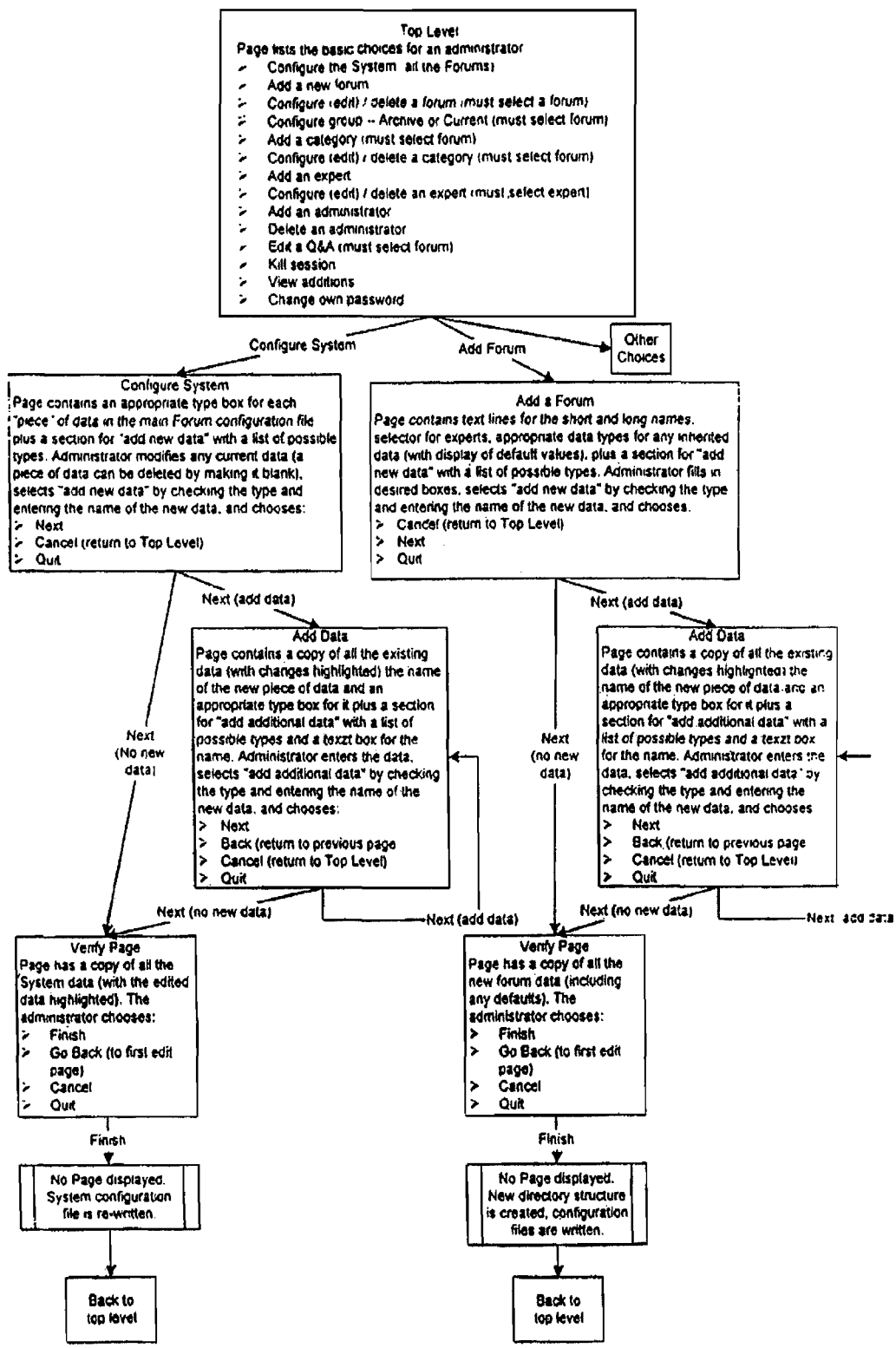
FIGS. 11A-J depict a flow chart showing one implementation of the administrator's interaction in detail.

As FIG. 11A shows, when the administrator chooses to configure the system, a configure system page is presented which contains information for the system configuration files and requests new data. The administrator can choose next (to add data), cancel (to return to the home page), or quit (to exit). The page for adding data contains a copy of existing data and the new data. From the add data page, the administrator can choose next, back (return to previous page), cancel (return to home page), or quit (exit). If 'next' is selected, or if no new data is being added, the administrator is prompted to verify the page, after which the finish command makes the appropriate changes and presents the home page.

As shown in FIG. 11A, the process is the same for adding a forum as for configuring the system, except that instead of a configure system page, an add forum page is presented which contains forum names, expert selectors, data types and requests new data.

Figure 11B:
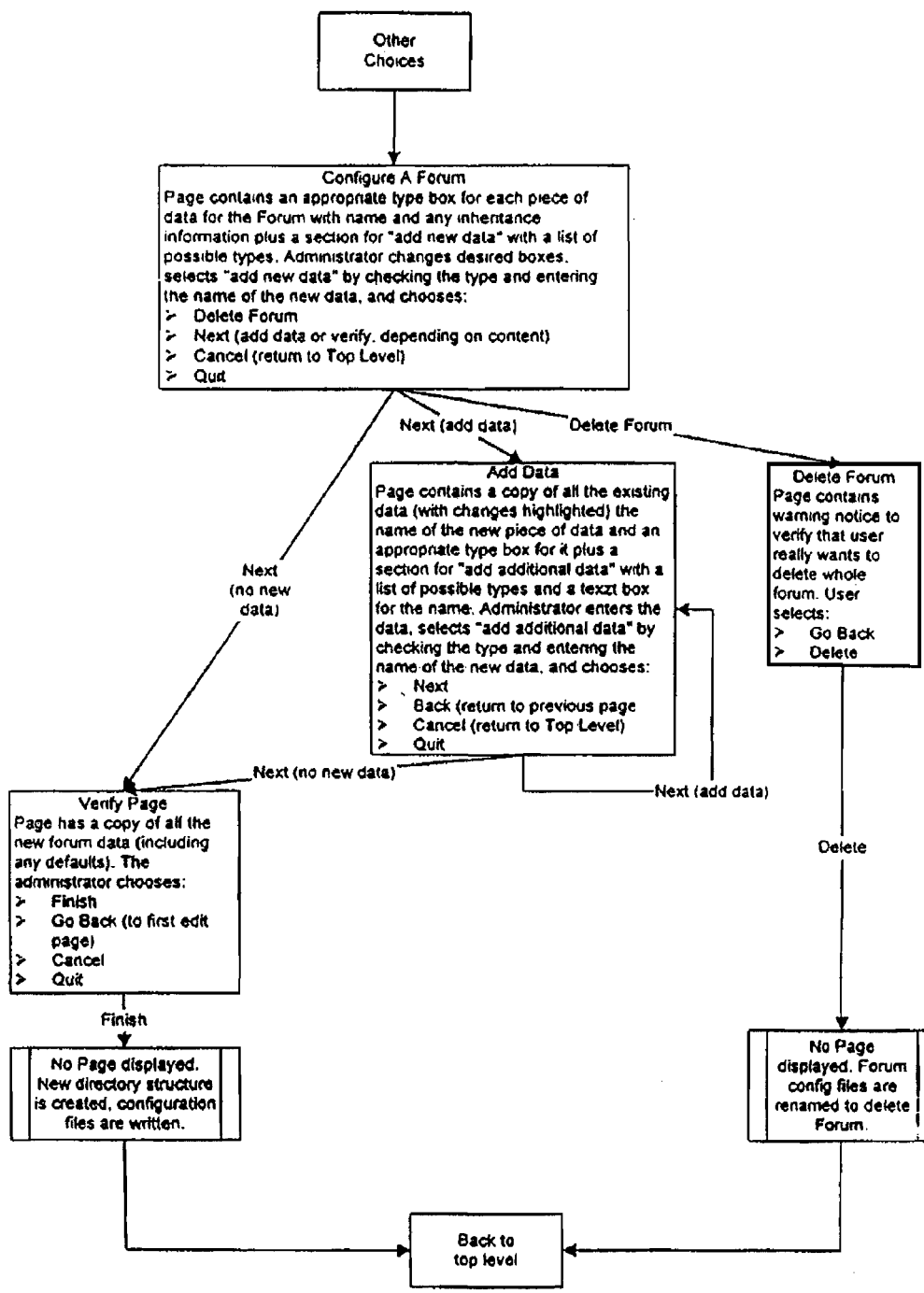

As shown in FIG. 11B, the process is the same for configuring a forum as for configuring the system, except that instead of a configure system page, a configure forum page is presented which contains the forum name and inheritance information, and requests new data. Also, from the configure forum page the administrator can choose to delete a forum, which prompts the user to verify the selection and then deletes the forum from the system.

Figure 11C:
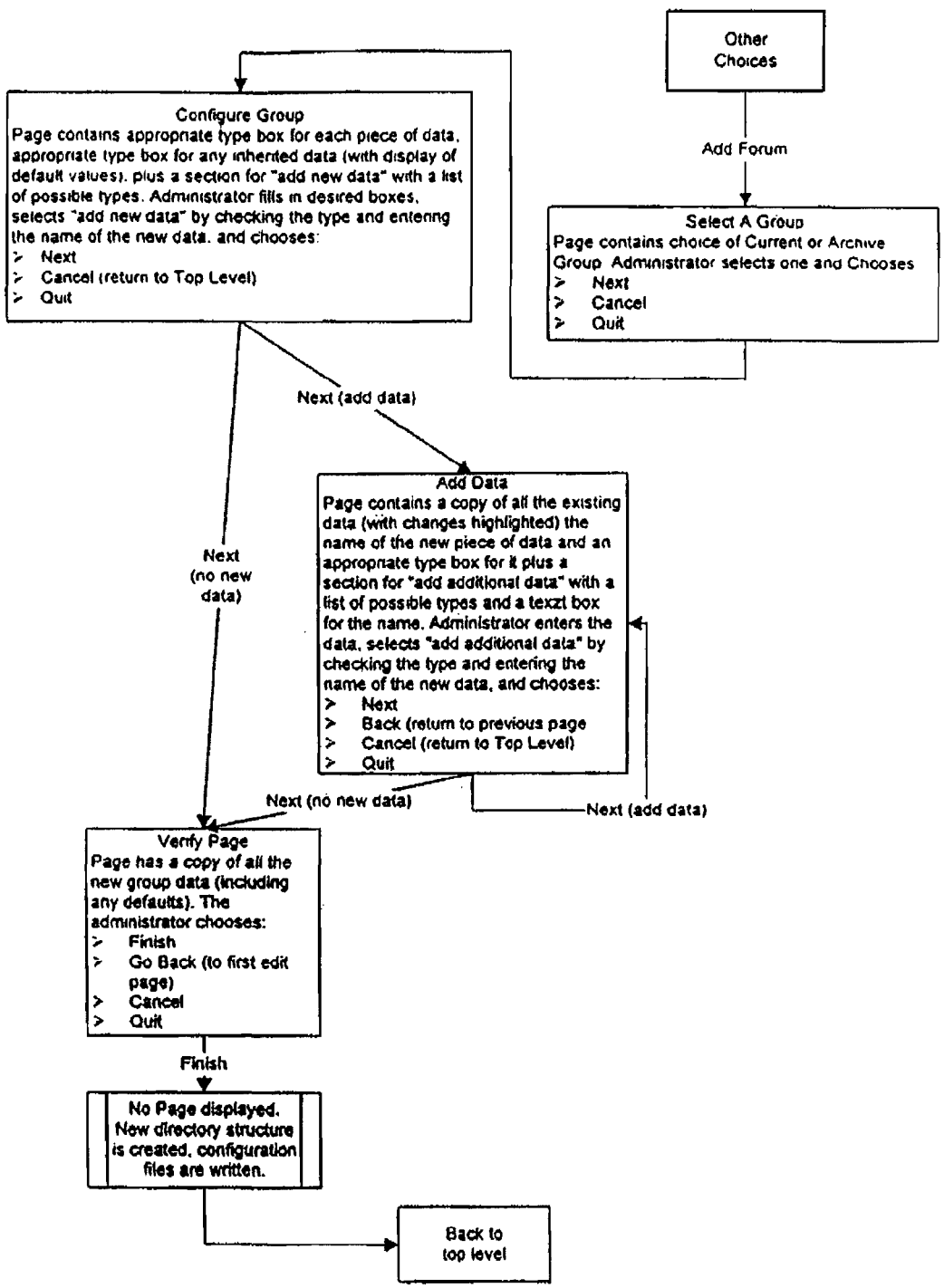

As shown in FIG. 11C, the process is the same for configuring a group as for configuring the system, except that instead of a configure system page, the administrator first selects a group and then a configure group page is presented which contains the group data and requests new data.

Figure 11D:
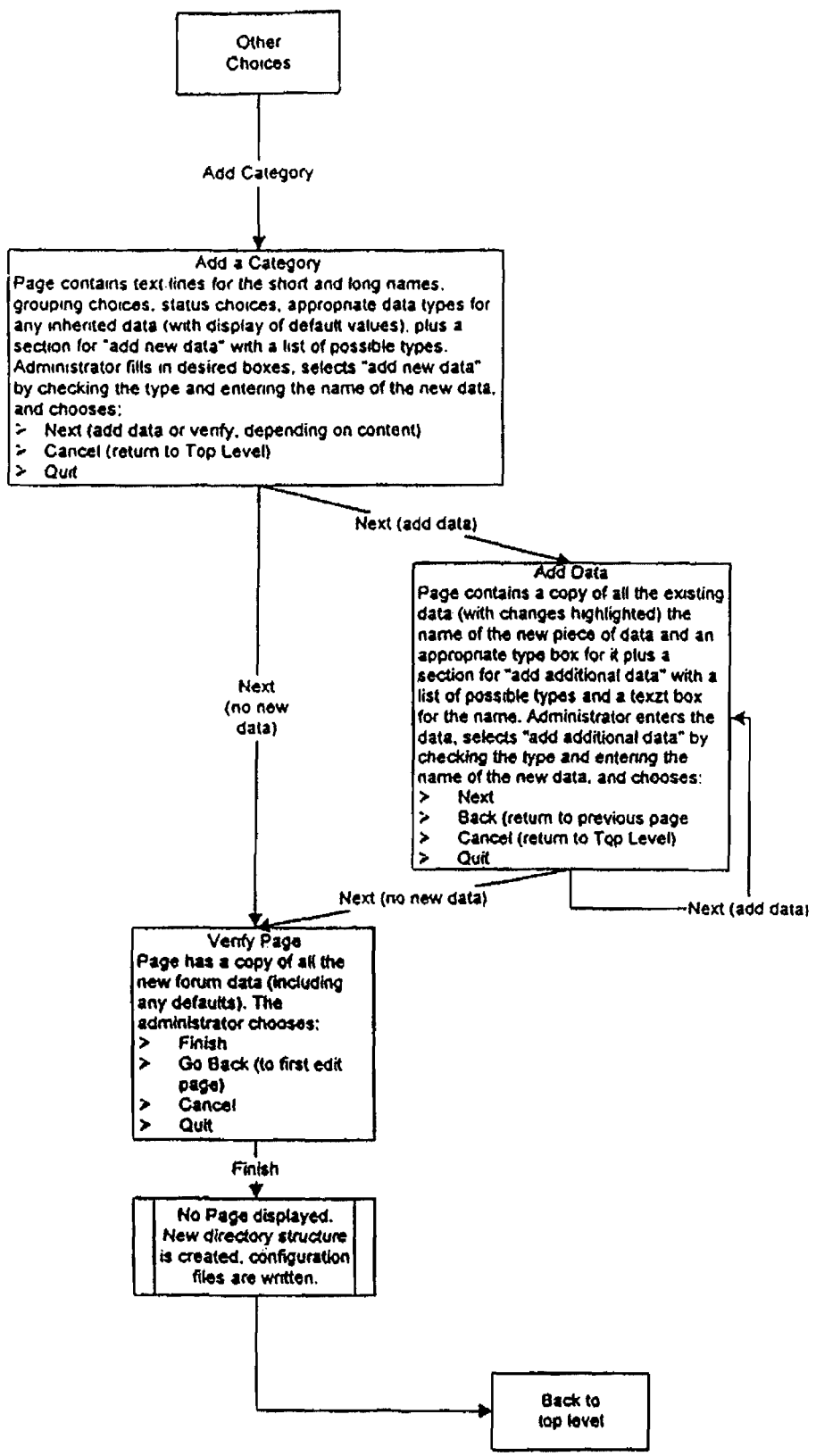

As shown in FIG. 11D, the process is the same for adding a category as for configuring the system, except that instead of a configure system page, an add category page is presented which contains category names, grouping choices, status choices, inheritance information, and requests new data.

Figure 11E:
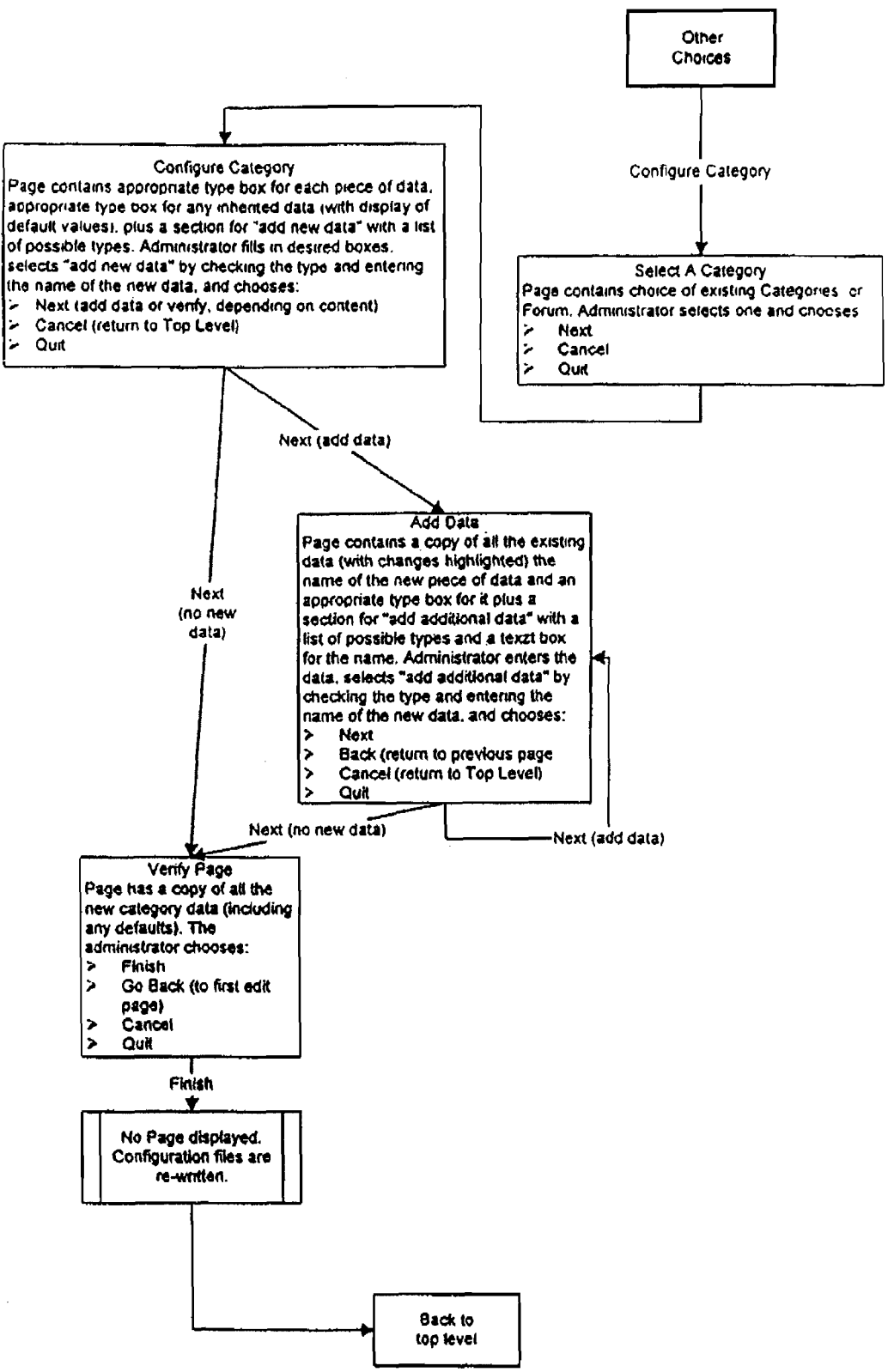

As shown in FIG. 11E, the process is the same for configuring a category as for configuring the system, except that instead of a configure system page, the administrator first selects a category and then a configure category page is presented which contains category data and requests new data.

Figure 11F:
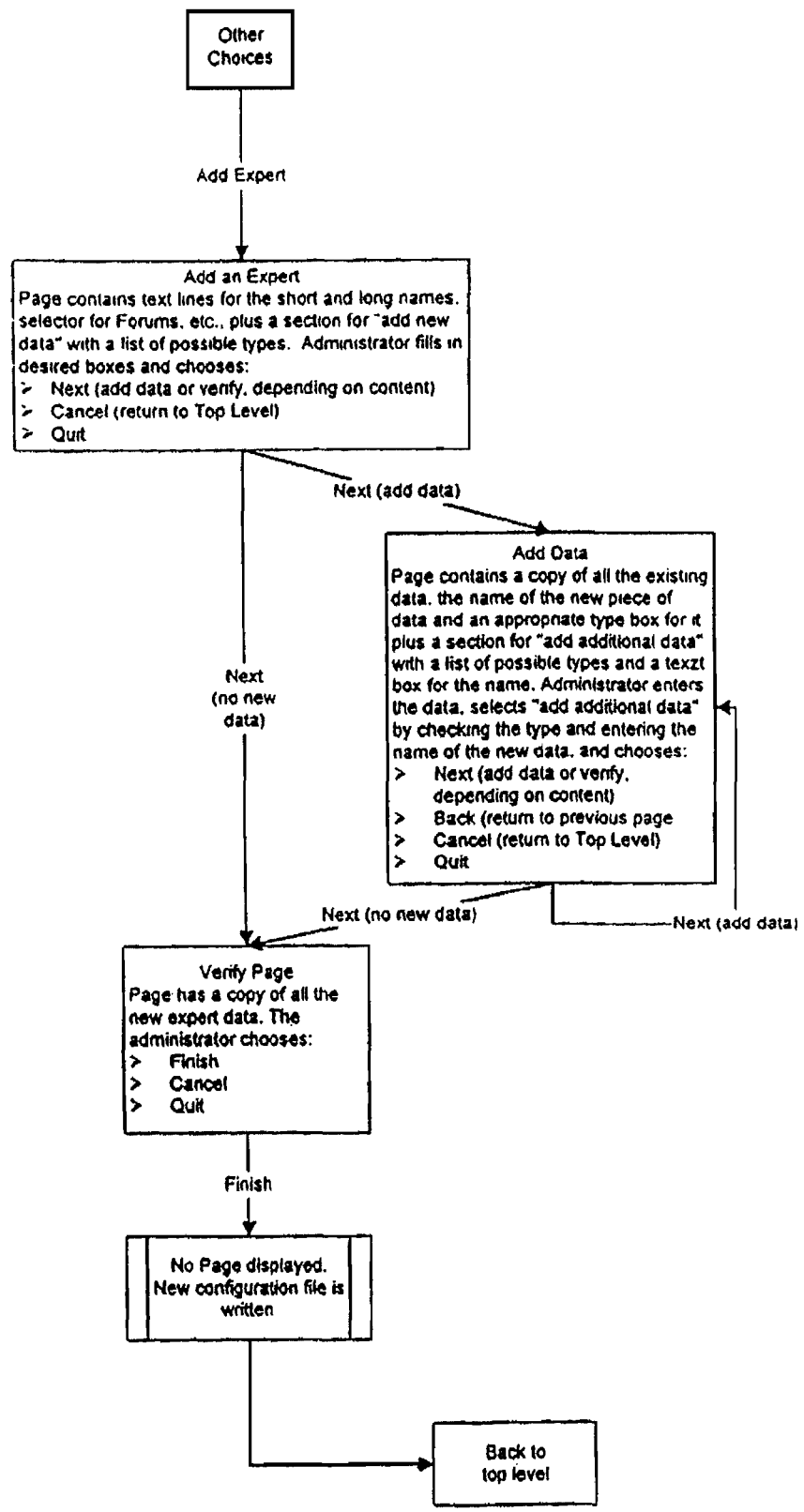

As shown in FIG. 11F, the process is the same for adding an expert as for configuring the system, except that instead of a configure system page, an add expert page is presented which requests expert names, forum selection, and any new data.

Figure 11G:
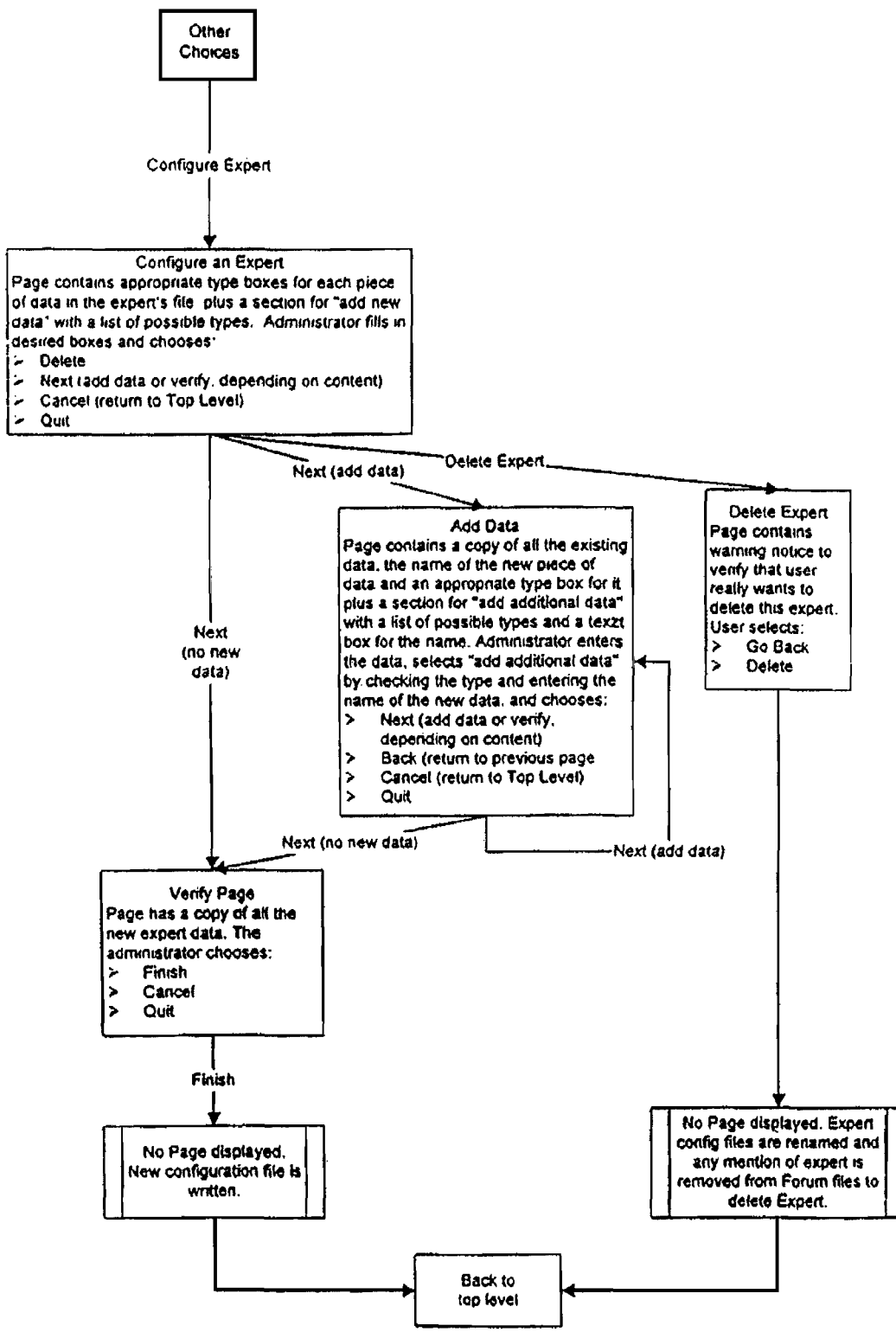

As shown in FIG. 11G, the process is the same for configuring an expert as for configuring the system, except that instead of a configure system page, a configure expert page is presented which contains the expert data and requests any new data. Also, from the configure expert page, the administrator can choose to delete an expert, which prompts the user to verify the selection and then deletes the expert from the system.

Figure 11H:
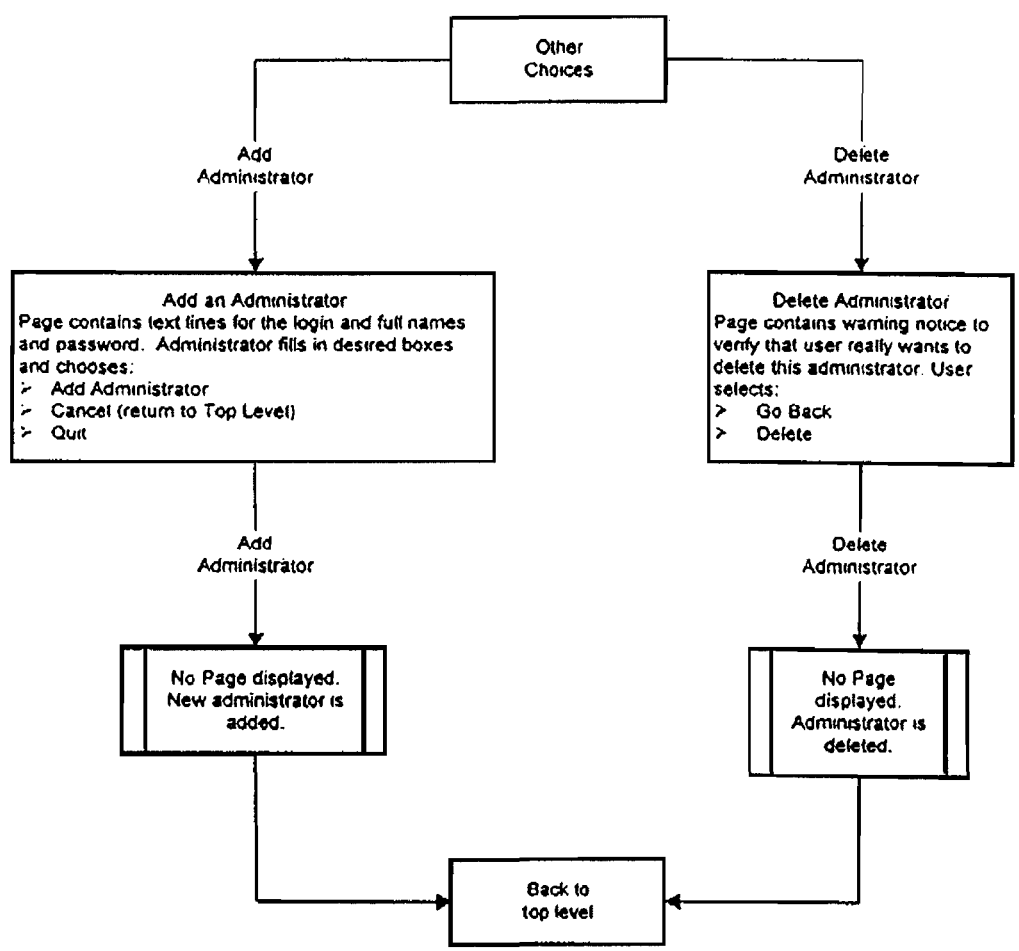

As shown in FIG. 11H, if the administrator chooses to add an administrator, an add administrator page is presented, which requests long and short names and a password. From that page, the administrator can choose add (adds the new administrator and returns to the home page), cancel (returns to the home page, or quit (exit).

As shown in FIG. 11H, if the administrator chooses to delete an administrator, a delete administrator page is presented, which prompts the administrator to verify the delete command or return to the home page. Once the command is verified, the administrator to be deleted is removed from the system, and the administrator returns to the home page.

Figure 11I:
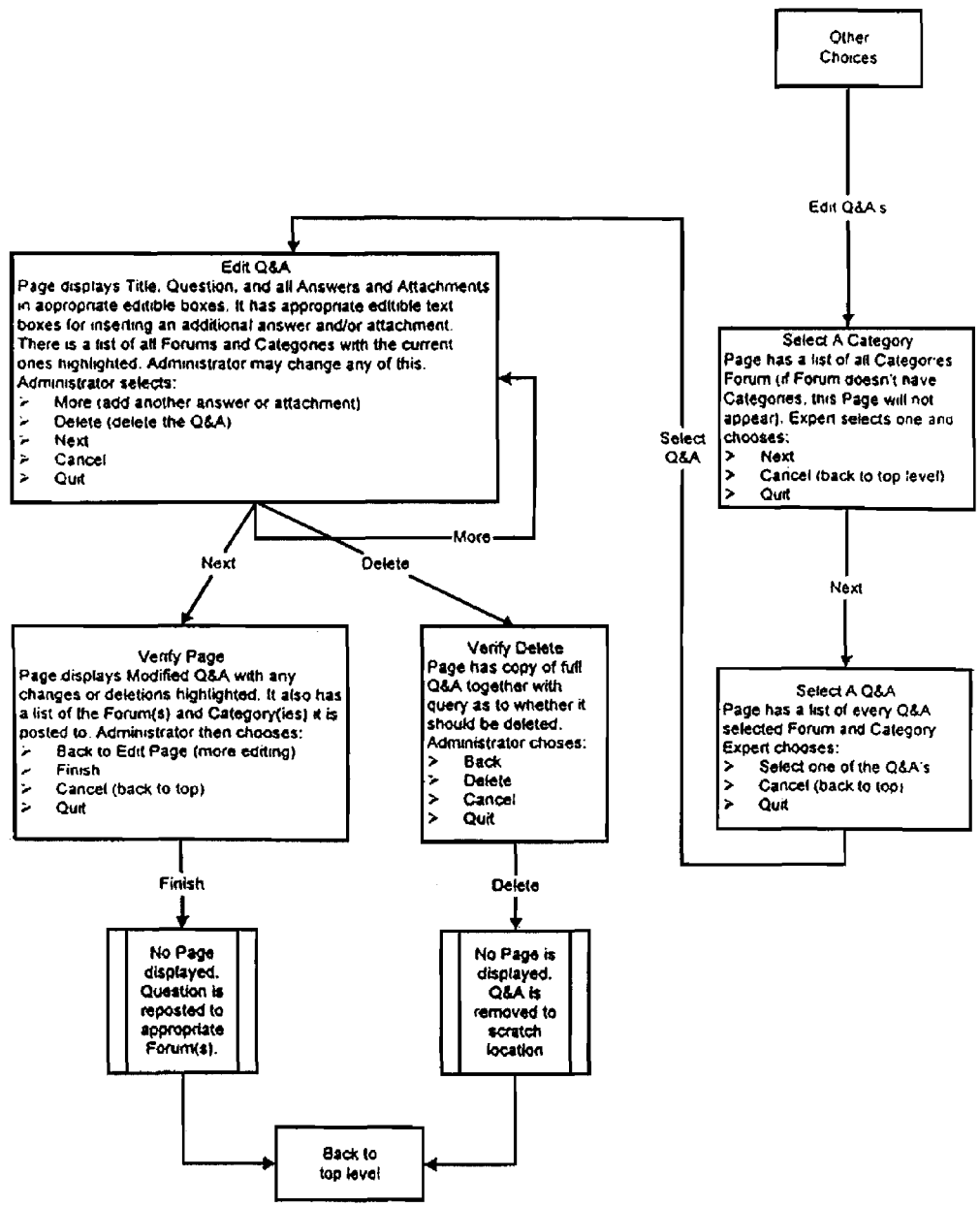

As shown in FIG. 11I, if the administrator chooses to edit and question and answer, the administrator then chooses a category and a question and answer. An edit question and answer page is presented which displays the title, question, all answers and attachments, and all relevant forums and categories. The administrator can change the information or delete the question and answer. To change the information, the administrator is prompted to verify and post the question and answer. To delete, the administrator must verify the command and then the question and answer is deleted.

After deleting a question and answer, or after verifying a question and answer, the administrator returns to the home page.

Figure 11J:
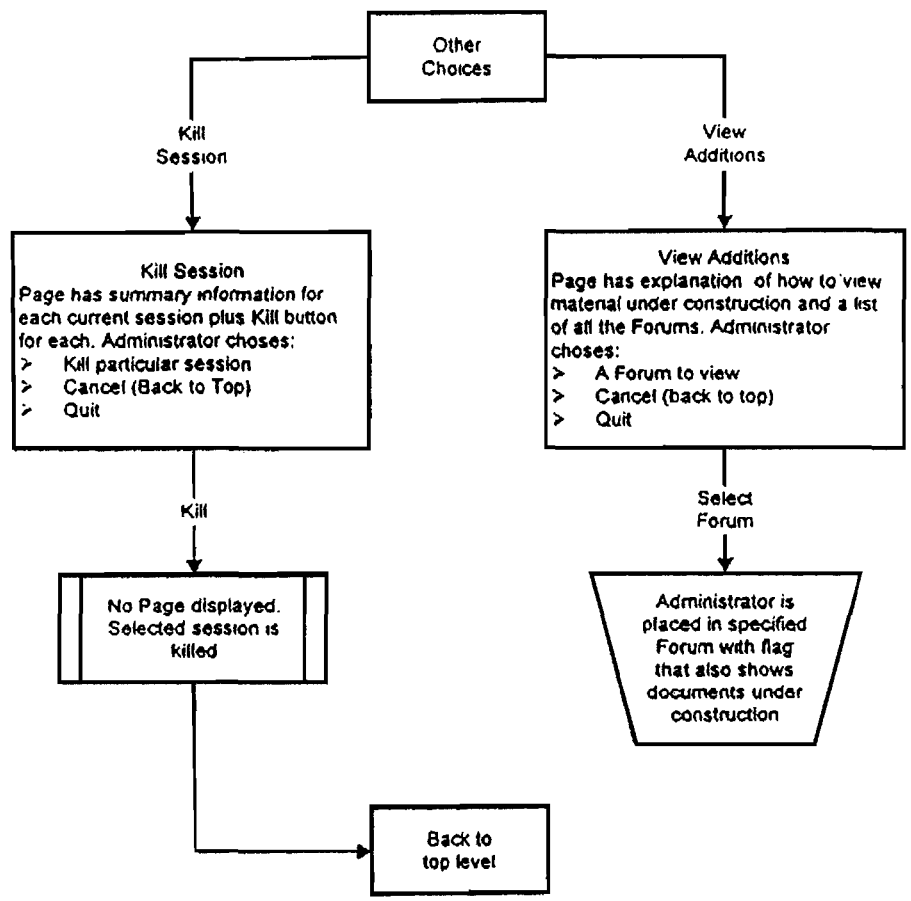

As shown in FIG. 11J, if the administrator chooses to kill a session, a kill session page is presented which has summary information for each current session and a kill button for each. The administrator can choose to kill a session, to cancel (return to the home page), or to quit (exit). If the kill option is selected, the session is killed and the administrator returns to the home page.

FIG. 11J also shows that, if an administrator chooses to view additions, a view additions page is presented which has a list of all forums. The administrator selects a forum to view and is presented with that forum which contains flags that show documents under construction.

FIG. 12 is an example of how an administrator's home page can appear on an administrator's interface, such as computer 112. The home page can include the administrator's name as well as the options available to the administrator, including a quit option.

FIG. 13 represents the menu of guides, stored on server 114, presented by the system to the administrator via administrator interface 112 in step 1004. The administrator can choose to configure the system (step 1302), add a forum (step 1304) or configure a forum (step 1306), configure a group of either current (step 1308) or archived (step 1310) messages, add (step 1312) or configure (step 1313) a category, add an expert (step 1314) or configure an existing expert (step 1316). Guides are also available to allow the administrator to add an administrator (step 1318) or delete an administrator (step 1320). The administrator has the capacity to edit a question (step 1322) or edit an answer (step 1324). The administrator also has the option to correct a forum manually (step 1326). Finally, the administrator can select the guide to view new material being added to the site (step 1328) or to change that administrator's password (step 1330).

Figure 14A:
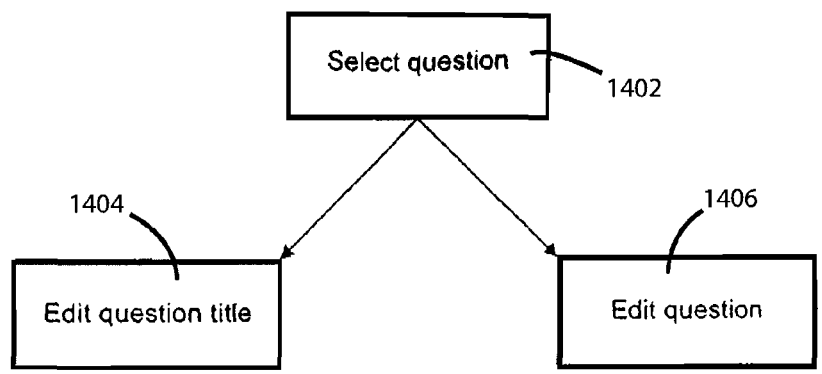
FIGS. 14A-B illustrate an administrator's ability to edit questions and answers for content or for other reasons.
Figure 14B:
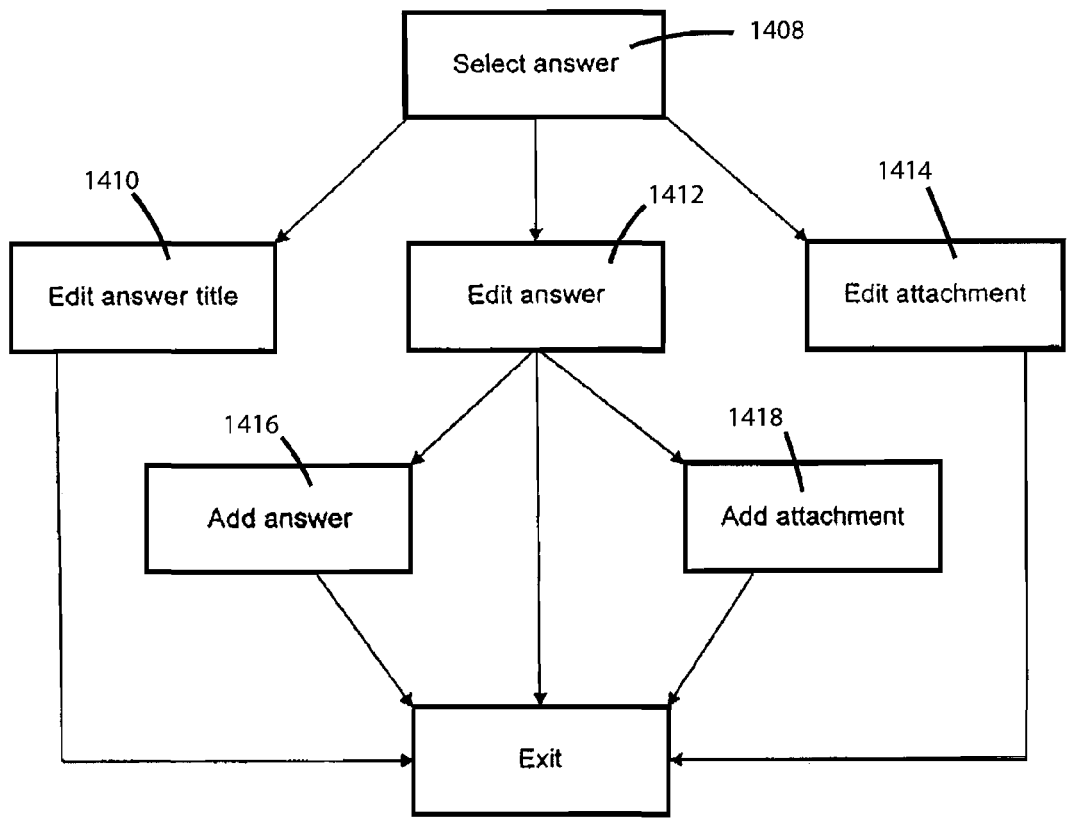

FIGS. 14A and 14B depict an administrator's ability to edit questions and answers content or for other reasons. The administrator, using administrator interface 112, can either select a question (step 1402) or select an answer (step 1408). If the administrator selects a question (step 1402), the administrator can then choose one of two options via administrator interface 112: (1) edit the question's title (step 1404), or (2) edit the question itself (step 1406). If the administrator selects an answer (step 1408), the administrator can use administrator interface 112 to choose from several options. The administrator can edit the title of an answer (step 1410). The administrator can also choose to edit the answer itself (step 1412). In editing an answer (step 1412), the administrator can choose to add an answer (step 1416) or add an attachment to that answer (step 1418). The administrator can also choose to edit an attachment to an existing answer (step 1414).

D. Dynamic Forum Management

Systems consistent with the present invention can interact with users, experts, and administrators through presenting a series of web pages. Web pages are made up of a number of fields. To display a web page, server 114 must locate the correct data for each field in the web page. Each field has a "name," e.g., <HEADING>, and a "value", e.g., <Answers to Treatment Questions>. The names and corresponding values are arranged in (name, value) pairs and stored in configuration files (e.g., system.cfg).

One way in which the current system can maintain these configuration files is using a hierarchical configuration of levels. Each level is a collection of configuration files corresponding to a part of the system. To display a web page, the system searches the configuration files at each level. The information found at the lowest level is displayed. This allows the administrator to specify default settings at the highest level while customizing any part of the site by changing the (name, value) pairs at the corresponding level.

Figure 15:
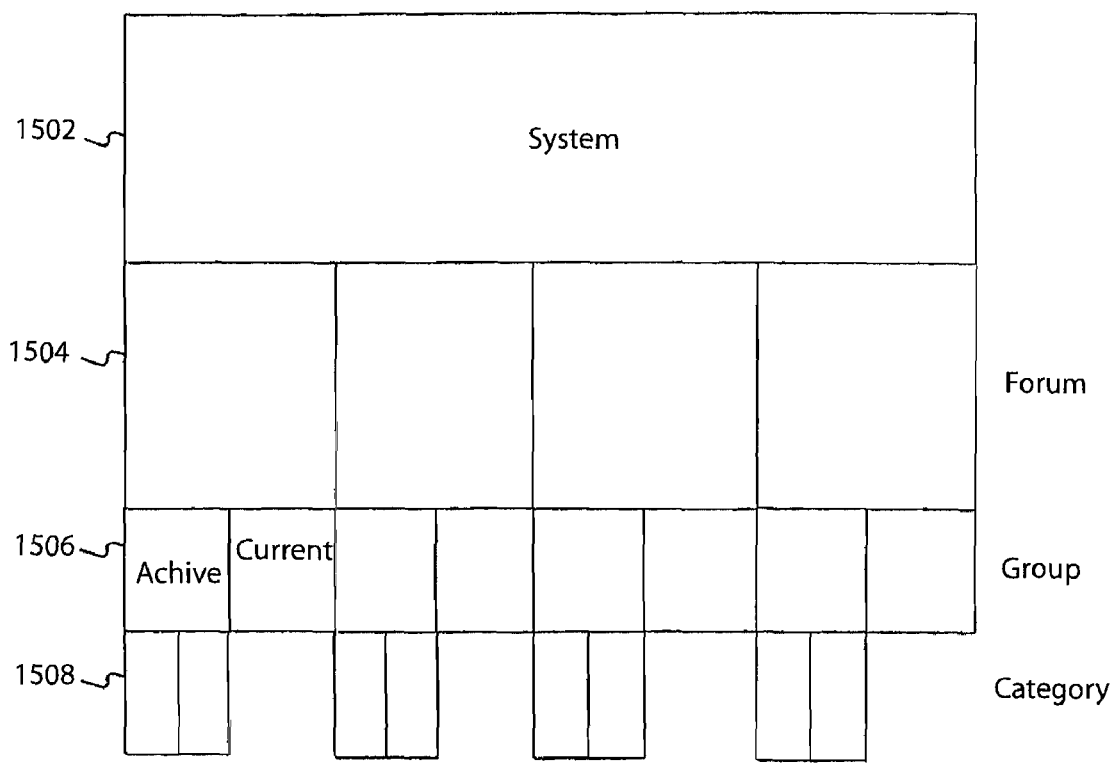
FIG. 15 is a high-level system diagram of a hierarchical configuration of levels, one way in which the current system can be implemented.

FIG. 15 is a high-level system diagram of one such hierarchy. The levels are arranged in order of increasing generalization. The highest level of generalization is the system level 1502. At a lower level of generalization than the system level is the forum level 1504. At a lower level of generalization than the forum level is the group level 1506. The groups at level 1506 can be either current or archived. At a lower level of generalization than the archived groups is the category level 1508. It is also possible to have a separate expert level.

When the system is searching for the heading text to be displayed at the top of a page currently in the prevention category of the treatment forum, the system starts at the top (system.cfg) and looks for a "<HEADING>" block. The system then visits each configuration file on the way down the hierarchy (forum.cfg would next in this example). Preferably, the system would use the matching "<HEADING>" block it finds at the lowest level.

Figure 16:
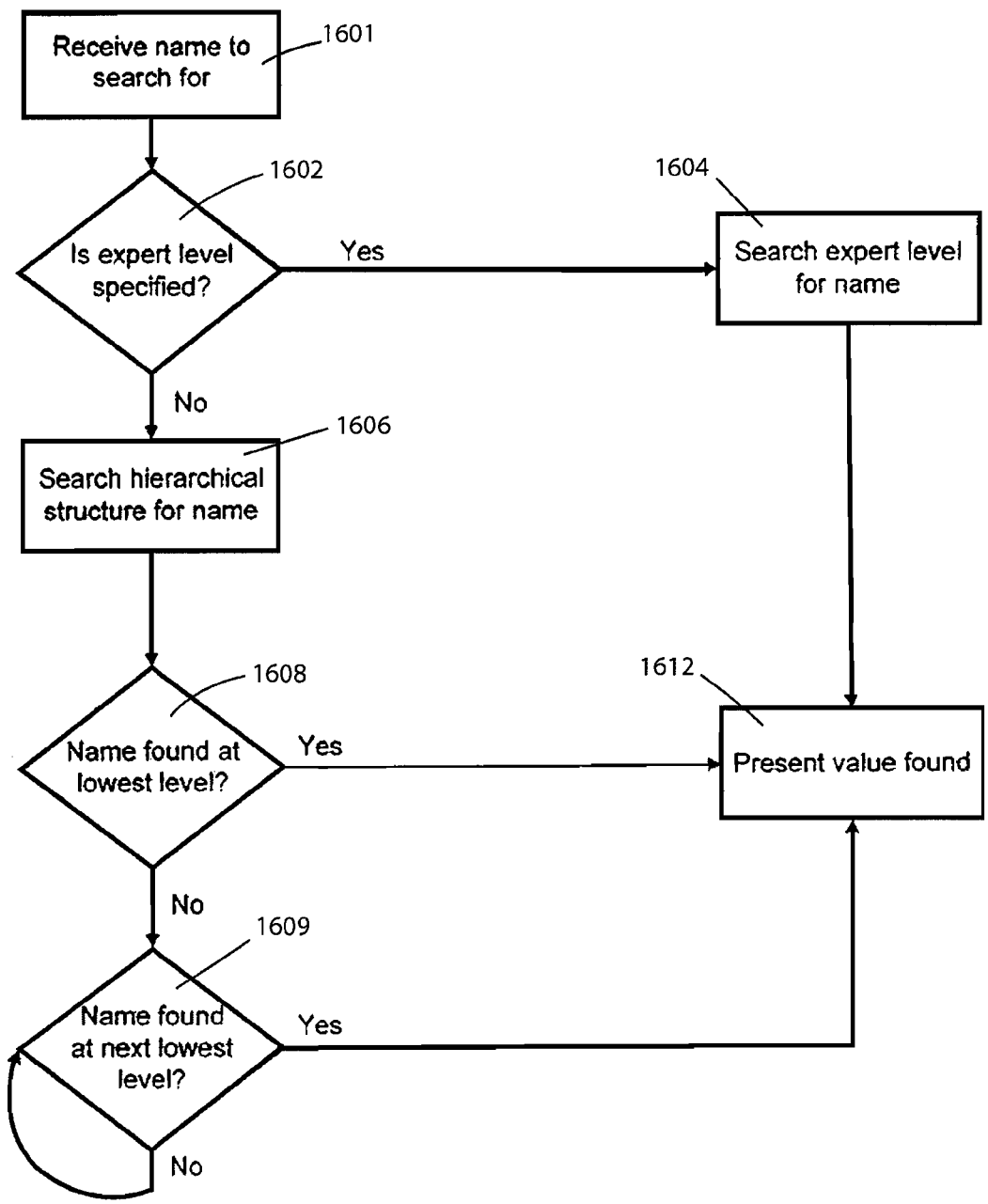
FIG. 16 is a flow chart showing the steps for displaying the proper web page information.

FIG. 16 is a flow chart showing the steps for displaying the proper web page information. First, the system receives the name to search for (step 1601). If the expert level is specified along with the name (step 1602), the system searches for the value corresponding to the given name at the expert level of the server (step 1604). The system then returns the value found at that level (step 1612). If the expert level is not specified, the system searches its hierarchical structure for the name and its corresponding value (step 1606). Beginning at the lowest level of generalization (step 1608), the system searches iteratively, moving to the next lowest level of generalization (step 1609) until the name is found. The system then presents the value corresponding to that name (step 1612).

If the levels are arranged in a hierarchical fashion, the administrator can change or create new pages at a certain level of the system by changing the value in the correct configuration file at that level. In addition, configuration files can correspond to each expert in the system, making it possible for the administrator to maintain settings for all experts or for each expert individually.

E. Conclusion

The foregoing description of an implementation of the invention is for illustration and description. It is not intended to be exhaustive or to limit the invention to the precise form disclosed. Modifications and variations are possible in light of the above teachings or may be acquired from practice of the invention.

What is claimed is:

1. A method executed by a server for enabling an expert to provide answers to questions received by the server from users in communication with a client interface, the client interface being identified to the users as a forum on a predetermined subject matter of the forum, the forum enabling users to direct questions to be answered to one or more of a plurality of experts represented as serving the forum, and the server being in communication with the client interface, the method comprising the steps of:

receiving at the server at least a first question directed to a first expert in the plurality of experts;

receiving at the server at least a second question representing one of (a) a question directed to the plurality of experts serving the forum, or (b) a question referred to the first expert by at least another expert in the plurality of experts;

receiving at the server a request by the first expert to access a personal expert interface, the personal expert interface being uniquely associated with the first expert;

the server providing the first expert with access to the at least one first question and the at least one second question upon generation of the personal expert interface, wherein the personal expert interface presents the at least one first question in a first grouping of questions directed to the first expert, and presents the at least one second question in a second grouping of questions directed either to the plurality of experts serving the forum, or directed to the first expert by the at least other expert in the plurality of experts.

2. The method of claim 1, further comprising the steps of:

the server providing the first expert upon generation of the personal expert interface with access to an answer to at least one third question, the answer to the at least one third question having been previously provided by the first expert and posted by the server to the forum via the client interface of the forum, wherein the server causes the personal expert interface to present the answer to the at least one third question to the first expert in a third grouping of answers to questions previously answered by the expert; and the server receiving a second command from the first expert via the personal expert interface to edit the answer to the at least one third question.

3. The method of claim 1, wherein the second grouping presents questions routed by the server to each of the plurality of experts, the plurality of experts comprising a panel of experts serving at least one of the plurality of forums, the second grouping of questions including one or more questions posted by one or more of the plurality of users in the at least one forum, the one or more questions including: (a) questions directed to the panel of experts by the one or more users, and (b) questions posted to the at least one forum by the one or more users without expert designation.

4. A system executed by a server for providing a plurality of answers from an expert to a plurality of questions posed by a plurality of users, the users communicating with the server via a plurality of client interfaces, each of the client interfaces being identified to the users as a forum on a predetermined subject matter of the forum and as presenting the expert as an expert on the subject matter, the system comprising:

a question receiving component configured to receive one of the plurality of questions at the server, the one question being directed to the expert from a user via one of the client interfaces;

a routing component configured to display the received question with other questions directed to the expert on a personal expert interface, wherein the personal expert interface is uniquely associated with the expert;

a command receiving and executing component configured to receive one or more commands from the expert together with an answer to the question, and to post the answer to the question, wherein the one or more commands provide that the answer to the question will be posted in two or more of the plurality of forums.

5. The system of claim 4 wherein the command receiving component is further configured to post the answer to one of (a) a source forum of the one client interface from which the user directed the question and at least one of the plurality of forums other than the source forum, (b) a plurality of forums excluding the source forum or (c) forums for each of the plurality of client interfaces.

6. The system of claim 5 wherein when the question is posted to a plurality of forums, the posting occurs in at least two forums at substantially the same time.

7. The system of claim 4 wherein the expert is presented in one of the forums as one of a plurality of experts comprising a panel of experts, wherein the question is received by the server as directed by one of the plurality of users from the client interface of the one forum, and wherein said routing component is configured to route the received question, according to an instruction of the one user, either to (a) the expert alone, or to (b) each of the plurality of experts in the panel of experts.

8. The system of claim 4 wherein said question receiving component is configured to receive at least two questions directed to the expert via client interfaces identified with at least two different forums.

9. The system of claim 4 wherein the expert is presented in one of the forums as one of a plurality of experts comprising a panel of experts, wherein the question is received by the question receiving component from the client interface of the one forum without direction by the user to any of the plurality of experts comprising the panel, and wherein said routing component is configured to route the received question to each of the plurality of experts in the panel of experts.

10. A personal expert interface in communication with a server, the personal expert interface enabling a plurality of users and a plurality of experts to communicate a plurality of questions to a first expert in the plurality of experts via the server, in order to obtain answers from the first expert, the personal expert interface comprising:

a web page uniquely associated with the first expert, the web page presents a plurality of groupings of questions to be answered to the first expert, wherein the plurality of groups presented to the first expert includes a first group of questions directed to the expert via the server by the plurality of users, and a second group of questions directed to the first expert by others of the plurality of experts on referral, the referred questions having previously been directed to the other experts by ones of the plurality of users, wherein the web page include a selectable command for posting an answer to at least one of the questions selected from at least one of the plurality of groupings, the at least one question being posted on one or more of a plurality of other web page accessible to the plurality of users.

11. The personal expert interface of claim 10 wherein each of the plurality of other web pages accessible to the plurality of users is identified to the users as a forum on a predetermined subject mailer of the forum, the first expert being identified on at least one of the other web pages as an expert on the predetermined subject matter of the forum, and the selectable command providing an instruction to post the answer to one of (a) a source forum of the one client interface from which the one user directed the question, (b) at least one one of the plurality of forums other than the source forum, (c) a plurality of forums including the source forum, (d) a plurality of forums excluding the source forum and (e) a forum of each of the plurality of client interfaces.

12. The personal expert interface of claim 11 wherein when the answer is posted to a plurality of web pages, the posting occurs in at least two web pages at substantially the same time.

13. The personal expert interface of claim 10 wherein at least one question from the second group of the questions is presented to the one expert for an initial answer.

14. The personal expert interface of claim 10 wherein at least one question from the second group of the questions is referred to the one expert by another one of the plurality of experts, the referred question provided by the other expert together with an answer to the question, the referral being made by the other expert to obtain a supplemental answer to the question from the one expert as a peer review of the answer provided by the other expert.

15. A method executed by a server of presenting questions that are submitted by at least one of a plurality of users to at least two experts, the questions being submitted via one of a plurality of client interfaces, each of the plurality of client interfaces being identified to the users as a forum on a predetermined subject matter of the forum, and the forum presenting the at least two experts as experts on the corresponding subject matter of the forum, the method comprising the steps of:
  the server receiving a question submitted by one of the plurality of users via one of the plurality of client interfaces identified as a forum;
  the server routing the submitted question for presentation to the one expert;
  the server presenting the question to the one expert via one of a plurality of personal expert interfaces, each personal expert interface being uniquely associated with one of the at least two experts and in communication with the server; and
  the server receiving a command via the personal expert interface of the one expert, the received command including an instruction for the server to route the question to another one of the at least two experts via a personal expert interface of the other expert.

16. The method of claim 15 wherein the received command further includes a second instruction to post an answer to the question.

17. The method of claim 15 wherein the received command further includes an answer to the question and a second instruction to post the answer to one of (a) a source forum, the source forum being identified with the one client interface from which the question was submitted, (b) at least one one of the plurality of forums other than the source forum, (c) a plurality of forums including the source forum, (d) a plurality of forums excluding the source forum and (e) forums identified with each of the plurality of client interfaces.

18. The method of claim 17 wherein when the answer is posted to a plurality of forums, the posting occurs in at least two forums at substantially the same time.

19. The method of claim 15, further comprising the steps of:
  the server receiving a second question via another one of the plurality of client interfaces identified as another forum; and
  the server routing the second question to the one expert.

20. The method of claim 15 further comprising the step of the server receiving a second command from the other expert, the second command including at least one answer to the question, the one answer being provided by the one expert, by the other expert, or by both experts.

21. The method of claim 20 wherein the answer from the other expert is posted to at least one web page of the one client interface.

22. The method of claim 20, wherein the second command further includes an instruction to post the at least one answer to one of (a) a source forum, the source forum being identified with the one client interface, (b) at least one of the plurality of forums other than the source forum, (c) a plurality of forums including the source forum, (d) a plurality of forums excluding the source forum and (e) forums identified with each of the plurality of client interfaces.

23. The method of claim 22, wherein the at least one answer is posted to a plurality of forums, and the posting occurs in at least two forums at substantially the same time.

24. The method of claim 15 wherein the received command includes an answer to the question, and the routing instruction further instructs that the answer be routed together with the question to the other expert, thereby requesting a peer review by the other expert of the answer provided by the one expert.

25. The method of claim 24 wherein the command further indicates permission from the one expert to post the answer to the one or more of the plurality of forums upon receipt of an additional answer from the other expert to whom the answer was referred.

26. The method of claim 24 wherein the received command further includes a private message for the other expert.

27. The method of claim 26 wherein the private message accompanies the includes instructions to the other expert to post the answer upon review of the question by the other expert.

28. The method of claim 27 further comprising step of the server receiving an instruction from the other expert to post the first answer.

29. A method executed by a server for providing answers from an expert via at least two client interfaces, each of the at least two client interfaces identified to users as a forum on a predetermined subject matter of the forum, whereby one or more users may choose to visit a forum, the expert being presented simultaneously in each of the at least two of the forums, the method comprising the steps of:
  receiving at the server at least two questions, one of the at least two questions being submitted via each of the at least two forums in which the expert is simultaneously presented;
  routing the at least two questions to the expert via the server;
  presenting the at least two questions to the expert by means of a personal expert interface, wherein the personal expert interface is uniquely associated with the expert,
  receiving at least two commands at the server via the personal expert interface of the expert, wherein a first one of the at least two commands includes a first answer to a first one of the questions submitted from one of the at least two forums and a first instruction instructing the server to post the first answer, and the second one of the at least two commands includes a second answer to a second one of the questions submitted from another one of the at least two forums and a second instruction instructing the server to post the second answer.

30. The method of claim 29 wherein the first and second instructions instruct the server to respectively post the first and second answers each to one of (a) a source forum, the source forum being identified with the forum from which the question was submitted and at least one of the at least two forums other than the source forum, (b) two or more of the at least two forums excluding the source forum, or (c) each-of the at least two forums.

31. The method of claim 30 wherein when either of the first or second answers is posted to two or more of the at least two forums, the posting occurs in the two forums at substantially the same time.

32. A method, executed by a server, for an expert to provide answers to questions presented by a plurality of users, the users communicating with the server via a plurality of client interfaces, each of the client interfaces being identified to the users as a forum on a predetermined subject matter of the forum, the forum enabling users to present questions and to view questions and answers relating to the predetermined subject mailer of the forum, the method comprising the steps of:

the server generating at least two forums;

the server receiving a question presented by a user accessing a first one of the at least two forums;

the server posting the question in a location on the server accessible to the expert;

the server presenting the question to the expert via a personal expert interface uniquely associated with the expert, and on which the question is displayed for the expert to answer;

receiving at the server a command via the personal expert interface from the expert in response to the question, wherein the command includes an answer for responding to the question and an instruction, wherein the instruction instructs the server to post the answer to the first forum accessed by the user to present the question and to at least a second one of the at least two forums, at which the question was not presented by the user.

* * * * *